United States Patent
Hara et al.

(10) Patent No.: US 9,363,101 B2
(45) Date of Patent: Jun. 7, 2016

(54) PACKET PROCESSING IN A PREDETERMINED ORDER AND SUSPENSION OF PACKET TRANSMISSION BY PREDETERMINED TIME INTERVALS BASED ON A SUSPENSION FLAG

(75) Inventors: Yuji Hara, Machida (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 13/471,925

(22) Filed: May 15, 2012

(65) Prior Publication Data

US 2012/0297392 A1 Nov. 22, 2012

(30) Foreign Application Priority Data

May 20, 2011 (JP) .................................. 2011-114111

(51) Int. Cl.
| | |
|---|---|
| *G06F 9/46* | (2006.01) |
| *H04L 12/46* | (2006.01) |
| *H04L 1/00* | (2006.01) |
| *H04L 12/801* | (2013.01) |
| *H04L 1/18* | (2006.01) |
| *H04J 3/08* | (2006.01) |
| *H04L 12/437* | (2006.01) |
| *H04L 12/40* | (2006.01) |

(52) U.S. Cl.
CPC .......... *H04L 12/4637* (2013.01); *H04L 1/0082* (2013.01); *H04J 3/085* (2013.01); *H04L 1/1854* (2013.01); *H04L 12/40071* (2013.01); *H04L 12/437* (2013.01); *H04L 47/10* (2013.01)

(58) Field of Classification Search
CPC ..................... H04L 12/4637; H04L 12/40071; H04L 1/0082
USPC ........................... 718/102; 370/222, 229, 400
See application file for complete search history.

(56) References Cited

U.S. PATENT DOCUMENTS

| | | | |
|---|---|---|---|
| 4,903,124 A | 2/1990 | Hoshi et al. | |
| 4,980,857 A * | 12/1990 | Walter et al. | 714/45 |
| 5,107,519 A | 4/1992 | Ishikawa | |
| 7,830,872 B2 * | 11/2010 | Yokoyama et al. | 370/389 |
| 8,505,013 B2 * | 8/2013 | Pollock et al. | 718/102 |
| 2001/0034799 A1 * | 10/2001 | Ito et al. | 709/250 |
| 2008/0028387 A1 * | 1/2008 | Nakagawa et al. | 717/172 |
| 2008/0037420 A1 * | 2/2008 | Tang | 370/229 |
| 2008/0239969 A1 * | 10/2008 | He et al. | 370/241.1 |
| 2009/0219818 A1 * | 9/2009 | Tsuchiya | 370/236 |
| 2009/0262645 A1 * | 10/2009 | Laulainen | H04L 47/10 370/235 |
| 2010/0150162 A1 * | 6/2010 | Nakayama | 370/400 |
| 2010/0172243 A1 * | 7/2010 | Nakata | H04L 45/00 370/237 |
| 2010/0235609 A1 | 9/2010 | Inoue et al. | |
| 2012/0047298 A1 | 2/2012 | Inoue et al. | |
| 2012/0047418 A1 | 2/2012 | Nakagawa et al. | |

FOREIGN PATENT DOCUMENTS

| | | | | |
|---|---|---|---|---|
| CA | WO 9522233 A1 * | 8/1995 | | G10L 19/167 |
| EP | 0 921 474 A1 | 6/1999 | | |
| JP | 11-167560 A | 6/1999 | | |
| JP | 2007-316699 A | 12/2007 | | |
| JP | 2010-217959 A | 9/2010 | | |

* cited by examiner

*Primary Examiner* — Abu Ghaffari

(74) *Attorney, Agent, or Firm* — Fitzpatrick, Cella, Harper & Scinto

(57) ABSTRACT

The invention relates to an information processing apparatus, which comprises a plurality of communication units connected to a bus in a ring shape. At least one of the plurality of communication units extends a transmission interval when it is determined that the processing unit, which is to execute the next process for received data, is the processing unit, which executes the process after the processing unit corresponding to the at least one of the plurality of communication units, and when it is detected that the process for the received data is suspended.

16 Claims, 8 Drawing Sheets

PACKET PROCESSING IN A PREDETERMINED ORDER AND SUSPENSION OF PACKET TRANSMISSION BY PREDETERMINED TIME INTERVALS BASED ON A SUSPENSION FLAG

BACKGROUND OF THE INVENTION

1. Field of the Invention

The present invention relates to an information processing apparatus, communication method, and storage medium, which transfer and process data using a ring-shaped bus.

2. Description of the Related Art

As a conventional method of efficiently transferring packets in a data-path control system in which a plurality of modules are connected to be able to communicate with each other, and execute parallel processes, a method of transferring packets according to their priority levels has been proposed.

Japanese Patent Laid-Open No. 11-167560 describes the following data transfer method. That is, in this data transfer method, a plurality of modules each including one or more stages of buffers or memories are connected in a ring shape, and packets as many as the number of modules are transferred on a ring bus, thus parallelly transferring the packets between modules and executing data processes. In the arrangement of Japanese Patent Laid-Open No. 11-167560, priority levels are determined by central control, thus implementing transfer according to the priority levels.

Japanese Patent Laid-Open No. 2007-316699 describes a packet transfer method based on priority levels distributed to respective modules. More specifically, modules are connected via two ring-shaped buses, that is, a data transfer bus and response transfer bus. Then, each module compares priority levels between a packet transferred from another module via the ring bus, and a packet generated by that module. When the generated packet has a higher priority level, the module discards the transferred packet. Then, the module outputs the packet generated by itself onto the ring bus. The module notifies, using the response transfer bus, a module as a transmission source of the transferred packet that the transferred packet is discarded. The module which is notified that the packet is discarded re-transmits the discarded packet. Then, packets are transferred based on priority levels.

When data transfer according to priority levels is implemented by central control as in the method of Japanese Patent Laid-Open No. 11-167560, a control circuit is more complicated as the number of modules increases, resulting in an increase in circuit scale. With the method of Japanese Patent Laid-Open No. 2007-316699, all the modules have to copy and hold all transmitted packets by the self modules until it can be judged that the transmitted packet is not discarded by another module. For this reason, a buffer size used to hold copies of transmitted packets increases considerably in proportion to an increase in the number of modules.

By contrast, Japanese Patent Laid-Open No. 2010-217959 describes a method which connects respective modules via a ring bus, and controls each module to transfer a data packet processed by that module to the next module, thereby executing a series of processes. With the arrangement of Japanese Patent Laid-Open No. 2010-217959, after a process is complete in a certain module, a signal including an identifier used to identify that module is output onto the ring bus. A module which executes the next process stores, in advance, an identifier of a module which executes an immediately preceding process, and executes a process if the signal includes that identifier. Also, in Japanese Patent Laid-Open No. 2010-217959, when a module suspends a process, it transfers a signal including information indicating that the process is suspended. When a module receives a signal, which was transmitted by itself and includes information indicating that a downstream module suspended a process, the former module determines that a module which executes a process immediately after the self module cannot process any more information transmitted from the self module, and pauses information transmission. Thus, in distributed control, efficient packet transfer is implemented by a small storage capacity.

In the method of Japanese Patent Laid-Open No. 2010-217959, a certain module detects whether or not suspension has occurred in a module which executes a process immediately after the self module. For this reason, when a module which executes a further downstream process suspended the process, modules which execute upstream processes may unwantedly continue processes. As a result, the number of suspended packets increases, resulting in a deadlock.

The present invention has been made in consideration of the aforementioned problems, and provides an information processing apparatus, information processing method, and storage medium, which execute appropriate transmission interval control based on a processing state of a processing device connected to each of communication devices, which are connected via a ring bus.

SUMMARY OF THE INVENTION

According to one aspect of the present invention, there is provided an information processing apparatus, which comprises a plurality of communication units connected to a bus in a ring shape, in which each of the communication units corresponds to a processing unit which executes a predetermined process, transmits data after the corresponding processing unit executes the process to another communication unit corresponding to a processing unit, which executes a subsequent process, via the bus at a predetermined transmission interval, and transfers data between the processing units and executes processes in a predetermined order, at least one of the plurality of communication units comprising: a determination unit configured to determine whether a processing unit which is to execute a next process for received data is a processing unit which executes a process after the processing unit corresponding to the at least one of the plurality of communication units; a detection unit configured to detect whether or not a process for the received data is suspended in the processing unit which is to execute the next process; and a control unit configured to control to extend a transmission interval when it is determined that the processing unit, which is to execute the next process for the received data, is the processing unit, which executes the process after the processing unit corresponding to the at least one of the plurality of communication units, and when it is detected that the process for the received data is suspended.

According to one aspect of the present invention, there is provided a communication method in an information processing apparatus, which comprises a plurality of communication units connected to a bus in a ring shape, in which each of the communication units corresponds to a processing unit which executes a predetermined process, transmits data after the corresponding processing unit executes the process to another communication unit corresponding to a processing unit, which executes a subsequent process, via the bus at a predetermined transmission interval, and transfers data between the processing units and executes processes in a predetermined order, at least one of the plurality of communication units comprising: controlling a determination unit to determine whether a processing unit which is to execute a next process for received data is a processing unit which executes a process after the processing unit corresponding to the at least one of the plurality of communication units; controlling a detection unit to detect whether or not a process for the received data is suspended in the processing unit which is to execute the next process; and controlling a control unit to control to extend a transmission interval when it is determined that the processing unit, which is to execute the next process for the received data, is the processing unit, which executes the process after the processing unit corresponding to the at least one of the plurality of communication units, and when it is detected that the process for the received data is suspended.

Further features of the present invention will be apparent from the following description of exemplary embodiments with reference to the attached drawings.

DESCRIPTION OF THE EMBODIMENTS

Figure 1:
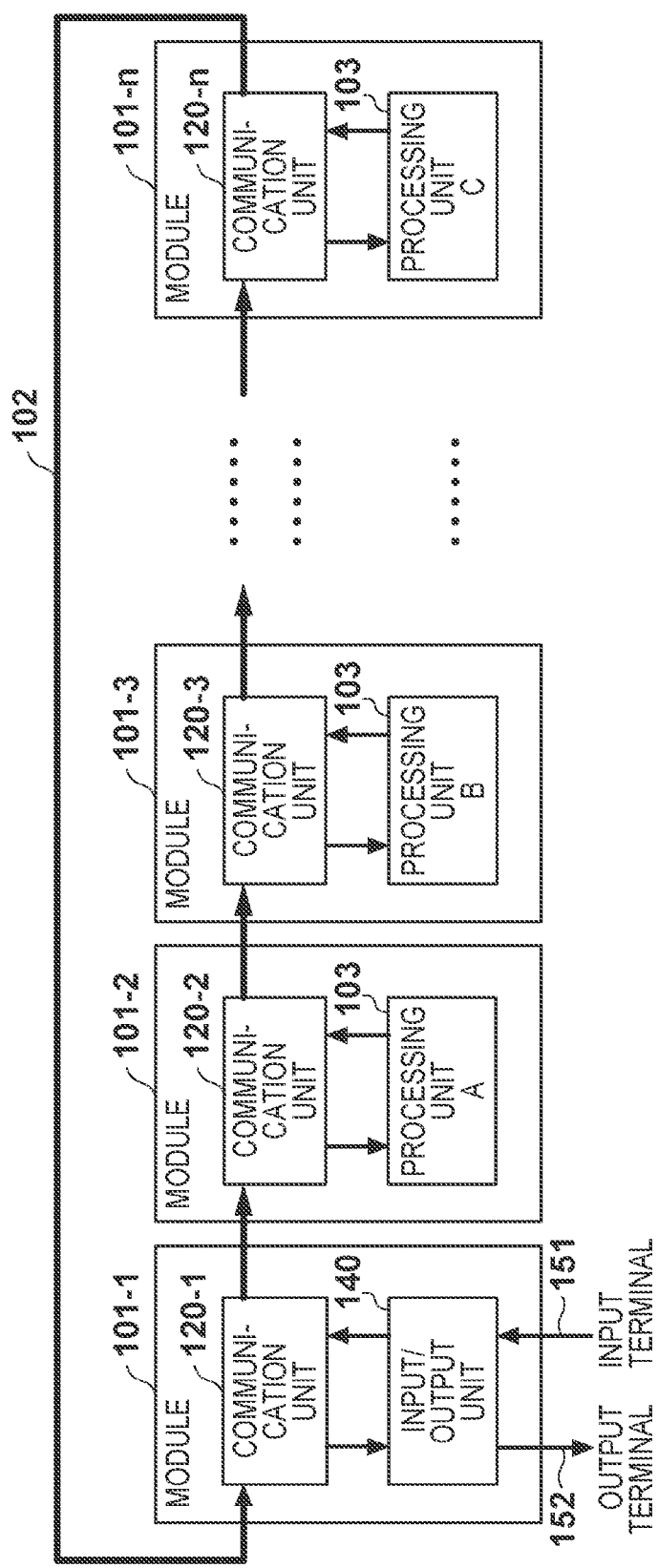
FIG. 1 is a block diagram showing the arrangement of a data-path control system.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment (System Arrangement)

A schematic arrangement of an information processing apparatus according to the present invention will be described first with reference to FIG. 9.

An image reading unit 920 includes, for example, a CCD sensor 924 and analog signal processor 926, and converts an image of a document 900, whose image is formed on the CCD sensor 924 via a lens 922, into R (Red), G (Green), and B (Blue) analog signals by the CCD sensor 924. The converted image information is input to the analog signal processor 926, and is analog-to-digital (A/D) converted after it undergoes correction processes or the like for respective R, G, and B colors. A digital full-color signal (to be referred to as a multi-valued digital image signal hereinafter) is input to an image processor 930. The image processor 930 applies an input correction process, spatial filter process, color space conversion, density correction process, and halftone process to the digital image signal, and outputs the processed digital image signal to an image output unit 940. The image output unit 940 has, for example, a print output unit (not shown) using an ink-jet head, thermal head, or the like, and records an image on a paper sheet based on the input digital image signal.

A system controller 910 includes a CPU 912 for arithmetic control, a ROM 914 which stores permanent data and programs, a RAM 916 which is used to temporarily store data and to load programs, and the like. The system controller 910 controls the image reading unit 920, image processor 930, image output unit 940, and the like, thereby systematically controlling the sequence of this apparatus. A storage device 918 is a medium (a flash memory or detachable storage medium) which stores parameters and programs used by this apparatus. The RAM 916 is configured to load data, programs, and the like from the ROM 914 and storage device 918.

Note that data transfer between the system controller 910 and image processor 930 is implemented by a DMAC (Direct Memory Access Controller; not shown).

Figure 9:
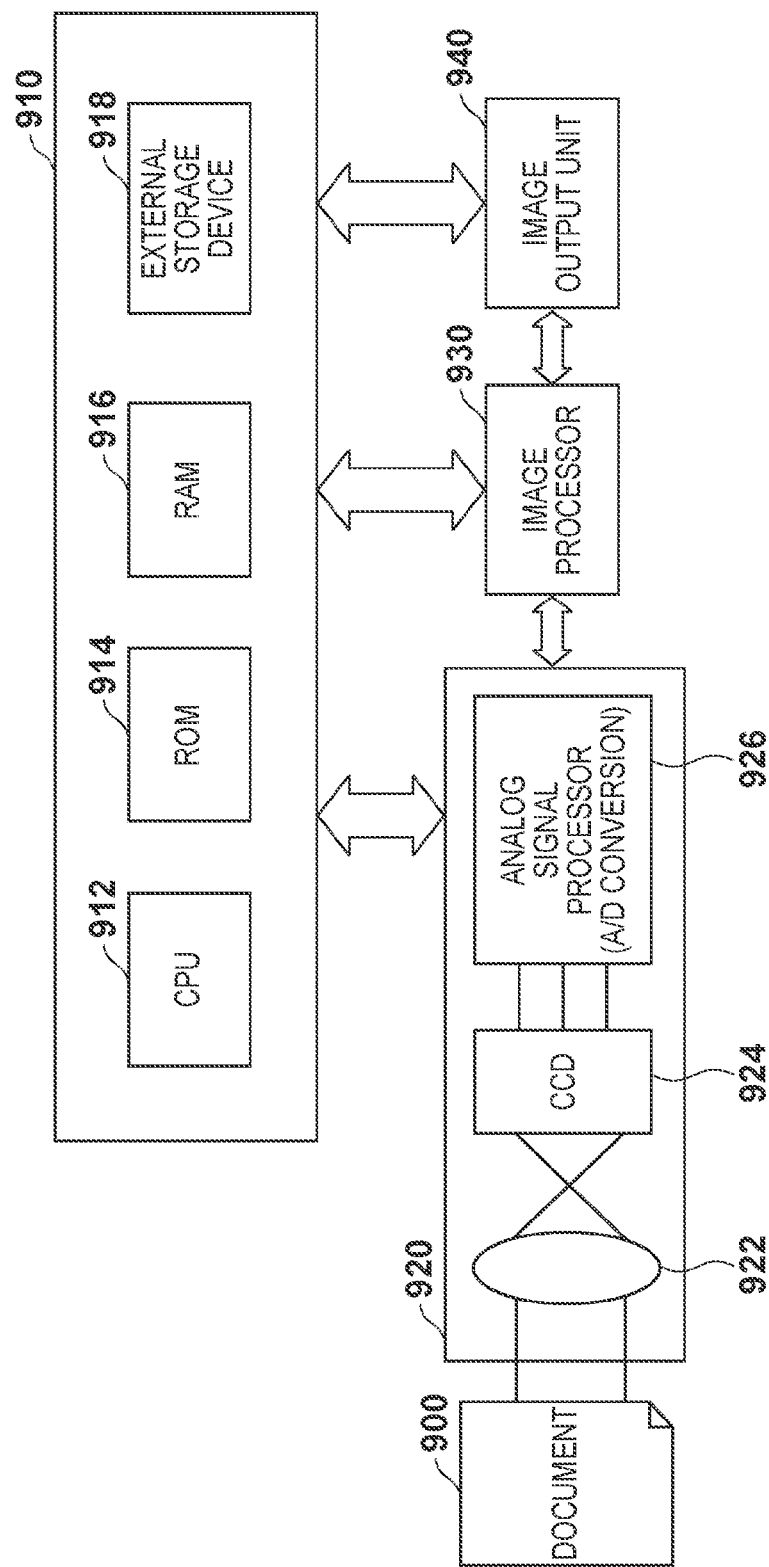
FIG. 9 is a schematic block diagram showing the arrangement of an information processing apparatus.

FIG. 1 shows details of the image processor 930 shown in FIG. 9 as a data-path control system. As shown in FIG. 1, the data-path control system has a plurality of modules 101 and a ring bus 102 which connects the respective modules. Each module 101 processes data received via the ring bus 102, and includes a communication unit 120 and a data processing unit 103 corresponding to the communication unit 120. Note that in this embodiment, a module 101-1 includes an input/output unit 140 in place of the corresponding data processing unit 103. The ring bus 102 is a bus which connects the plurality of modules 101 in a ring shape. In this embodiment, the communication units 120 of the modules 101 are connected to a bus in a ring shape, and the input/output unit 140 transfers data, which is input from a unit outside the data-path control system in one direction. This data-path control system functions as an information processing apparatus as the whole system by transferring data between the data processing units 103 and sequentially executing processes by the plurality of data processing units 103. Note that the "unit outside the data-path control system" indicates other functional units in an apparatus which includes this data-path control system, and corresponds to the system controller 910, image reading unit 920, and image output unit 940 shown in FIG. 9. However, the present invention is applicable to an external apparatus which exists independently of the apparatus including this data-path control system. Also, it may respectively arrange DMACs for an input 151 and output 152 of the input/output unit 140. In this case, the DMACs packetize image data and parameters held in the RAM 916 and input a packet to the image processor 930. Also, the DMACs depacketize a packet output from the image processor 930 and transfer data and the like to the RAM 916 and CPU 912.

(Functional Arrangement of Module)

Figure 2:
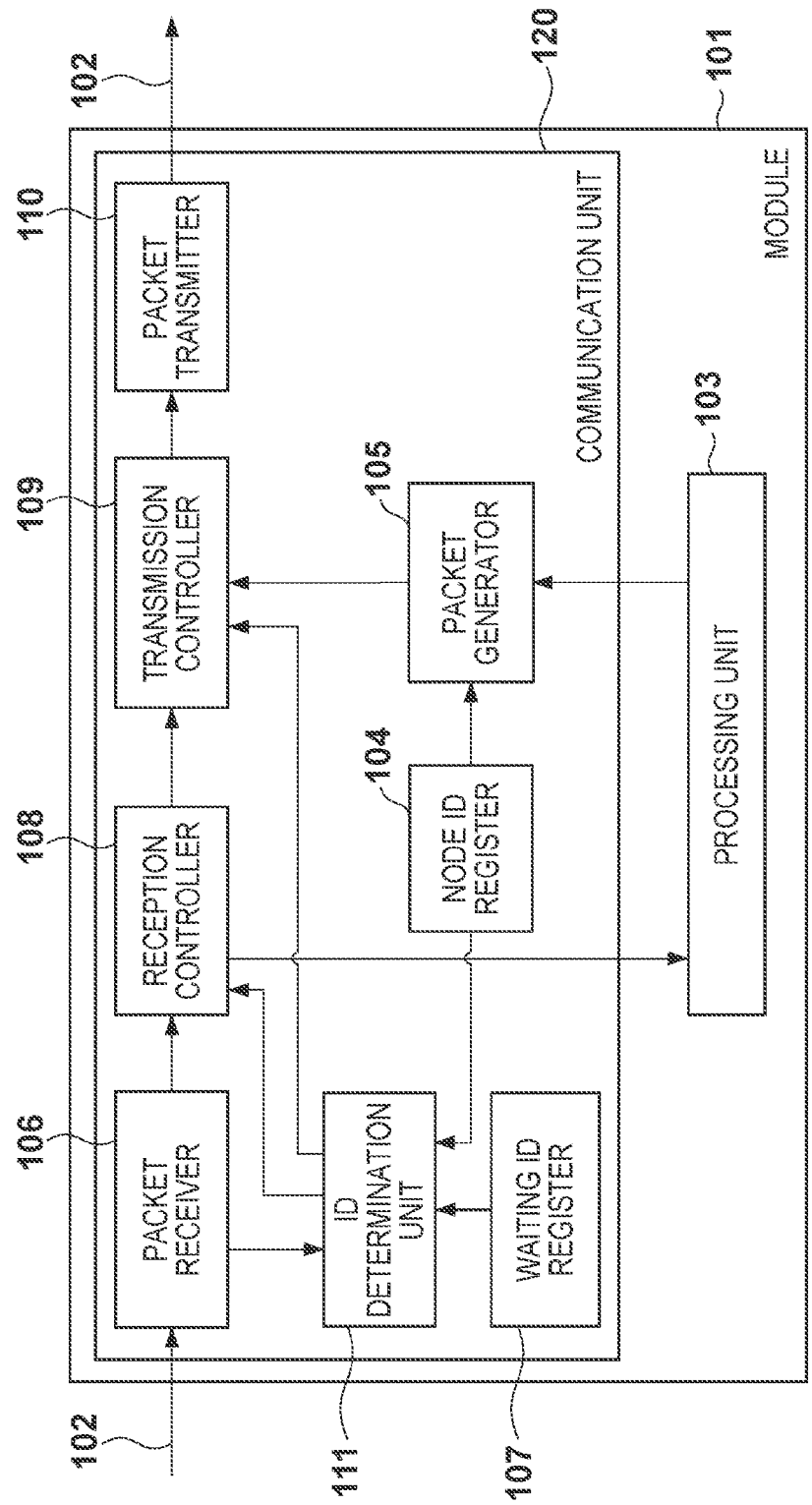
FIG. 2 is a block diagram showing the functional arrangement of a module.

FIG. 2 is a block diagram showing the functional arrangement of the module 101 shown in FIG. 1. In FIG. 2, the communication unit 120 of the module 101 includes a node ID register 104, packet generator 105, packet receiver 106, waiting ID register 107, reception controller 108, transmission controller 109, packet transmitter 110, and ID determination unit 111. The respective units are controlled by a CPU or the like (not shown).

The data processing unit 103 executes a predetermined data process assigned for each module 101. The node ID register 104 sets an ID of a node (identification information of the node), to which the module 101 is connected, so as to be appended to a packet generated by the module 101. The packet generator 105 generates a packet to be transferred via the ring bus 102 based on data processed by the data processing unit 103. The packet receiver 106 receives a packet from another module via the ring bus 102. The waiting ID register 107 stores an ID, which is appended to data to be processed by the data processing unit 103. This ID is, for example, a node ID appended by the module which executed the immediately preceding process when the process execution order is determined in a plurality of modules.

When data included in a packet received by the packet receiver 106 is to be processed by the self module, and execution of a process is allowed, the reception controller 108 inputs the data to the data processing unit 103. On the other hand, when data included in a packet received by the packet receiver 106 is not to be processed by the self module, or any process is not allowed, the reception controller 108 passes the packet intact to the transmission controller 109. The transmission controller 109 executes control for transmitting a packet including data processed by the data processing unit 103 and that passed from the reception controller 108 onto the ring bus 102. The packet transmitter 110 transmits packets onto the ring bus 102.

The ID determination unit 111 compares an ID included in a packet received by the packet receiver 106 with those respectively stored in the node ID register 104 and waiting ID register 107, and determines whether or not they match. The ID determination unit 111 generates control information of the reception controller 108 and transmission controller 109 based on respective ID values. For example, when an ID included in a packet matches that stored in the waiting ID register 107, data included in the packet is to be processed by the self module. For this reason, the ID determination unit 111 generates a control signal, which instructs the reception controller 108 to pass the data to the processing unit. For example, when an ID included in a packet matches that stored in the node ID register 104, the packet was generated by the self module, and is returned after going round the ring bus 102. For this reason, the ID determination unit 111 transmits control information that advises accordingly to the transmission controller 109, thus appropriately executing transmission interval control.

In the data-path control system of this embodiment, the modules 101 are connected to a bus in a ring shape to form a ring type network topology. The number of modules 101 connected to the ring bus 102 is not limited. Since each module 101 transfers one packet to the next module 101 in each common cycle between neighboring modules 101, the respective modules 101 parallelly execute data transfer. By appropriately making settings of the waiting ID register 107 and node ID register 104, a data processing path is configured, and input data can be processed by the plurality of processing modules in a requested order.

(Packet Configuration)

Figure 3:
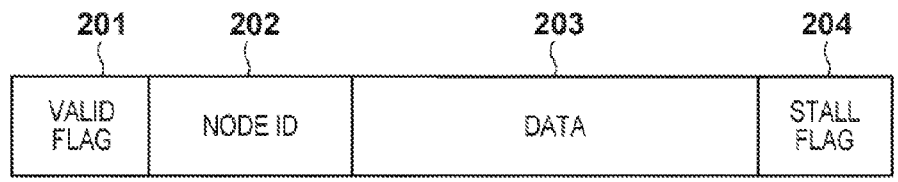
FIG. 3 is a view showing an example of the configuration of a packet to be output onto a ring bus.

A packet used in data transfer between the modules 101 according to this embodiment will be described below with reference to FIG. 3. The packet includes a Valid flag 201, node ID 202, data 203, and Stall flag 204. The Valid flag 201 indicates whether or not the packet is valid. A packet in which the Valid flag 201 is not valid is, for example, an empty packet. For this reason, when the Valid flag 201 is not valid, the module 101 can output the packet at its timing. On the other hand, when the Valid flag is valid, that packet has to be processed or transferred. For this reason, when there is a packet to be transferred at a given timing, another packet cannot be transferred simultaneously with that packet.

The node ID 202 is an identifier which is appended by a packet transmission source and indicates a connection node. The node ID 202 is assigned a value (node ID) which allows to identify a connection state between the transmitting and receiving modules of the packet. In this embodiment, for example, each module 101 waits for a node ID appended by the module which executes a process immediately before the self module, and stores it in the waiting ID register 107. Upon reception of a packet including that node ID, the module 101 processes data included in that packet. The data 203 is that held by the packet. The Stall flag 204 indicates that the module, which is to originally execute a process for data held by a packet, suspended the process, for example, for a reason that it is processing another data.

(Operation of Module)

A packet transfer operation between the modules of the data-path control system will be described below. A packet reception operation will be described first. The ID determination unit 111 determines whether or not a packet received by the packet receiver 106 includes data to be processed by the data processing unit 103 of the self module 101. Alternatively, the ID determination unit 111 determines whether or not the data included in the packet is to be processed by another module. This determination is attained by comparing the node ID 202 of the received packet with an ID value stored in the waiting ID register 107. For example, when an ID value of a received packet to be processed is stored in the waiting ID register, and the IDs match, the data processing unit 103 executes a process.

The ID determination unit 111 controls the reception controller 108 based on the determination result. The reception controller 108 outputs data included in a packet to be processed by the corresponding data processing unit 103 to the data processing unit 103. Then, the reception controller 108 outputs other packets to the transmission controller 109. However, even when a packet includes data to be processed by the data processing unit 103, for example, that data may be unable to be processed by the data processing unit 103 since, for example, the process of another data is underway, and another process cannot be executed. Upon detection of this state, the reception controller 108 passes the packet to the transmission controller 109 while setting "1" in the Stall flag 204 to indicate that the process is suspended.

An operation for transmitting data processed by the data processing unit 103 to the next module which is to process that data using the packet shown in FIG. 3 will be described below. The packet generator 105 generates a packet. The packet generator 105 stores the data processed by the data processing unit 103 in a field of the data 203 of the packet, and stores an ID value of the node ID register 104 in a field of the node ID 202. Furthermore, the packet generator 105 validates the Valid flag 201 of the packet. The transmission controller 109 controls transmission timings of the packet generated by the packet generator 105 and that directly input from the reception controller 108 onto the ring bus 102 via a buffer.

(Arrangement Example of Transmission Controller)

Figure 4:
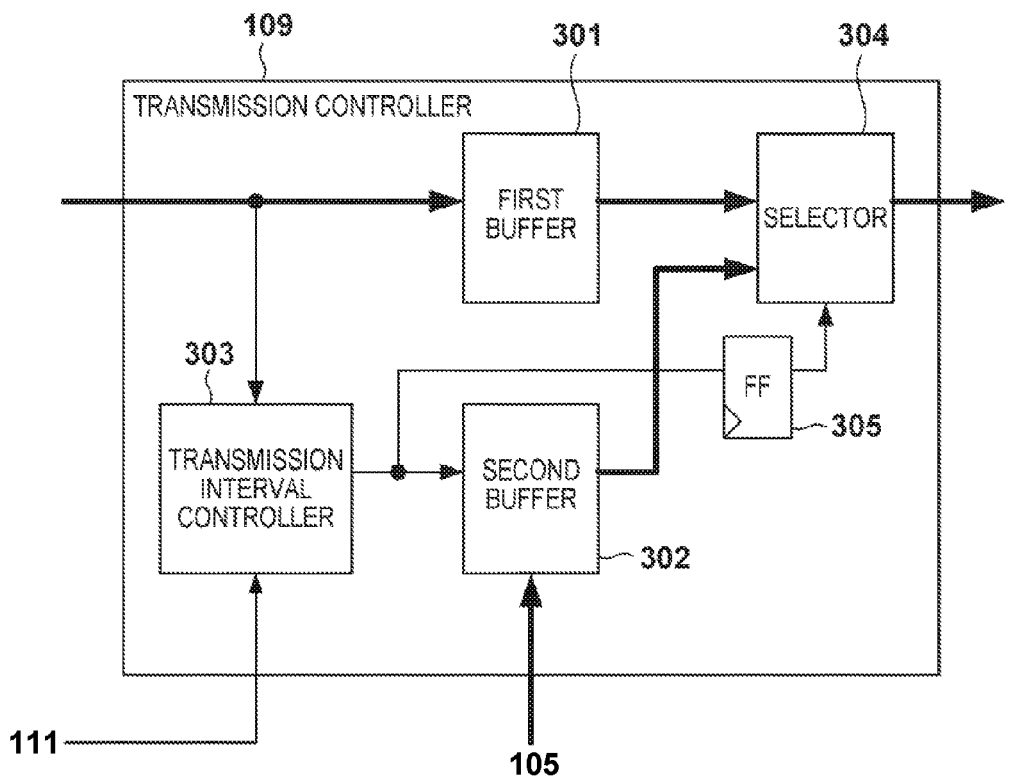
FIG. 4 is a block diagram showing an example of the arrangement of a transmission controller.

An example of the arrangement of the transmission controller 109 according to this embodiment will be described below with reference to FIG. 4. The transmission controller 109 in this example includes a first buffer 301, second buffer 302, transmission interval controller 303, selector 304, and timing adjustment FF (flip-flop) 305. The first buffer 301 holds a packet from the reception controller 108. More specifically, the first buffer 301 stores a packet passed through the reception controller 108 or a packet holding data which is to be processed by the self node but cannot be processed by the data processing unit 103. The second buffer 302 holds a packet which is generated by the packet generator 105 and includes data processed by the data processing unit 103.

The transmission interval controller 303 controls a transmission interval of a packet from the second buffer 302. The selector 304 selects a packet to be transmitted. Which of packets stored in the first and second buffers 301 and 302 is to be transmitted is selected by the selector 304. At this time, the transmission interval controller 303 decides whether or not a packet stored in the second buffer 302 is transmittable. The transmission interval controller 303 has an internal timer, which is set with a predetermined value every time a packet is transmitted, and maintains a minimum packet transmission interval. This transmission interval can be set using, for example, a register, and a value according to processing performances of the modules 101 which execute downstream processes is set. Note that the FF 305 delays an output valid signal 410 (to be described later) by one cycle in correspondence with output timings of the first and second buffers 301 and 302. Then, the selector 304 is controlled based on the output from the FF 305.

In this embodiment, a processing order relationship between the transmission source module of a received packet and the self module is determined based on the node ID 202. By checking this determination result and the Stall flag 204 of the received packet, which module is in a process suspended state is detected. The transmission interval controller 303 dynamically controls and changes a transmission interval from the second buffer 302 according to this detection result, thereby improving the packet transfer efficiency. More specifically, for example, when the module 101 detects that another module 101 which executes a downstream process after the self module is in a process suspended state, it pauses an output operation of a packet stored in the second buffer 302. Then, this pause period is varied according to the number of packets whose processes are suspended. Thus, the ring bus 102 can be prevented from being filled with valid packets in a process suspended state, and a slight waiting time is given to a small number of packets in a process suspended state, thus improving the throughput of the whole system.

(Functional Arrangement of Transmission Interval Controller)

An example of the arrangement of the transmission interval controller 303 will be described below with reference to FIG. 5. The transmission interval controller 303 in this example includes a timer 403, load controller 404, transmission interval selector 405, first register 406, second register 407, adder 408, and limiter 409.

The timer 403 controls a transmission interval. In this embodiment, for example, the timer 403 is a down counter with a load function, which counts down from a loaded value toward zero. The load controller 404 controls loading of a transmission interval to the timer 403. The load controller 404 receives an ID determination signal 401, Stall flag 402, and timer value 411, and outputs an output valid signal 410 and load signal 412.

In this case, the ID determination signal 401 assumes a value "1" when an ID of a received packet is equal to a value in the node ID register 104. That is, the ID of the received packet is equal to the value of the node ID register 104 when the received packet is that which was previously generated and transmitted by the self module. When an ID of a received packet is not equal to the value in the node ID register 104, and when the ID of the received packet is equal to the value in the node ID register 104 but the Valid flag 201 indicates "invalid", the ID determination signal 401 assumes a value "0". The ID determination signal 401 is input from the ID determination unit 111.

The Stall flag 402 is input from the reception controller 108. For example, when the Stall flag 402 is "1", it indicates that a process of a received packet is suspended; when the flag 402 is "0", it indicates that a process is not suspended. That is, when the ID determination signal is "1" and the Stall flag is "1", they indicate that a signal including data processed by the data processing unit 103 of the self module was transmitted, but another module suspended a process immediately after the self module, and that signal is returned. The timer value 411 indicates a value of the timer 403.

The output valid signal 410 is required for the transmission interval controller 303 to control an output interval of the second buffer 302. When the timer value 411 is "0" and at least one of the ID determination signal 401 and Stall flag 402 are not "1", the output valid signal 410 assumes a value "1" indicating "valid"; otherwise, the signal 410 assumes a value "0". When the second buffer 302 and selector 304 receive the output valid signal 410="1", they output a signal stored in the second buffer onto the ring bus 102. However, since the selector 304 receives the output valid signal 410 via the FF 305, it selects an output of the second buffer 302 after a delay of one cycle. The load signal 412 is required for the load controller 404 to control the load timing of an output interval to the timer 403. When the timer value 411 is "0" or when the ID determination signal 401 is "1" and the Stall flag 402 is "1", the load signal 412 assumes a valid value "1"; otherwise, the signal 412 assumes a value "0". That is, when the timer 403 reaches a time-out, or when data processed by the data processing unit 103 of the self module is returned while its process was suspended by another module, the load signal 412 controls the timer 403 to load a transmission interval.

The transmission interval selector 405 selects a transmission interval to be loaded to the timer 403. The transmission interval selector 405 selects an output of the limiter 409 (to be described later) when the ID determination signal 401 is "1" and the Stall flag 402 is "1". Otherwise, the transmission interval selector 405 selects a value of the first register 406 (to be described later). When the load signal 412 is "1", the timer 403 loads a value selected by the transmission interval selector 405, and executes a count-down operation.

The first register 406 stores a predetermined setting value required to assure a minimum packet transmission interval. The second register 407 stores a to-be-added value required to dynamically control a transmission interval. The adder 408 adds the timer value 411 and the to-be-added value of the second register 407. The limiter 409 limits an output value of the adder 408 to be equal to or smaller than a predetermined value. In this case, the predetermined value indicates a period corresponding to, for example, one round of the ring bus 102.

When the Stall flag 402 is "1" and the ID determination signal 401 is "1", they indicate that the packet was output from the module 101 which received that packet, and is returned after another module 101 which is to execute a subsequent process suspended the process. For this reason, when such state is detected, the load controller 404 controls the timer to delay data to be output from the second buffer 302. More specifically, the load controller 404 loads a value of the limiter 409, which is larger than a value of the register 406, to the timer 403. Furthermore, when a large number of packets for which both the ID determination signal 401 and Stall flag 402 are "1" are detected, the load controller 404 controls the adder 408 to increase a value to be loaded to the counter accordingly. Thus, an appropriate waiting time can be set according to the number of packets for which both the ID determination signal 401 and Stall flag 402 are "1". Furthermore, using the limiter 409, the waiting time can be suppressed to fall within a predetermined time range. Thus, the module can be prevented from keeping waiting even after the process suspended state in another module is recovered, thereby preventing a throughput drop of the whole system.

(Operation of Transmission Interval Controller)

Figure 6:
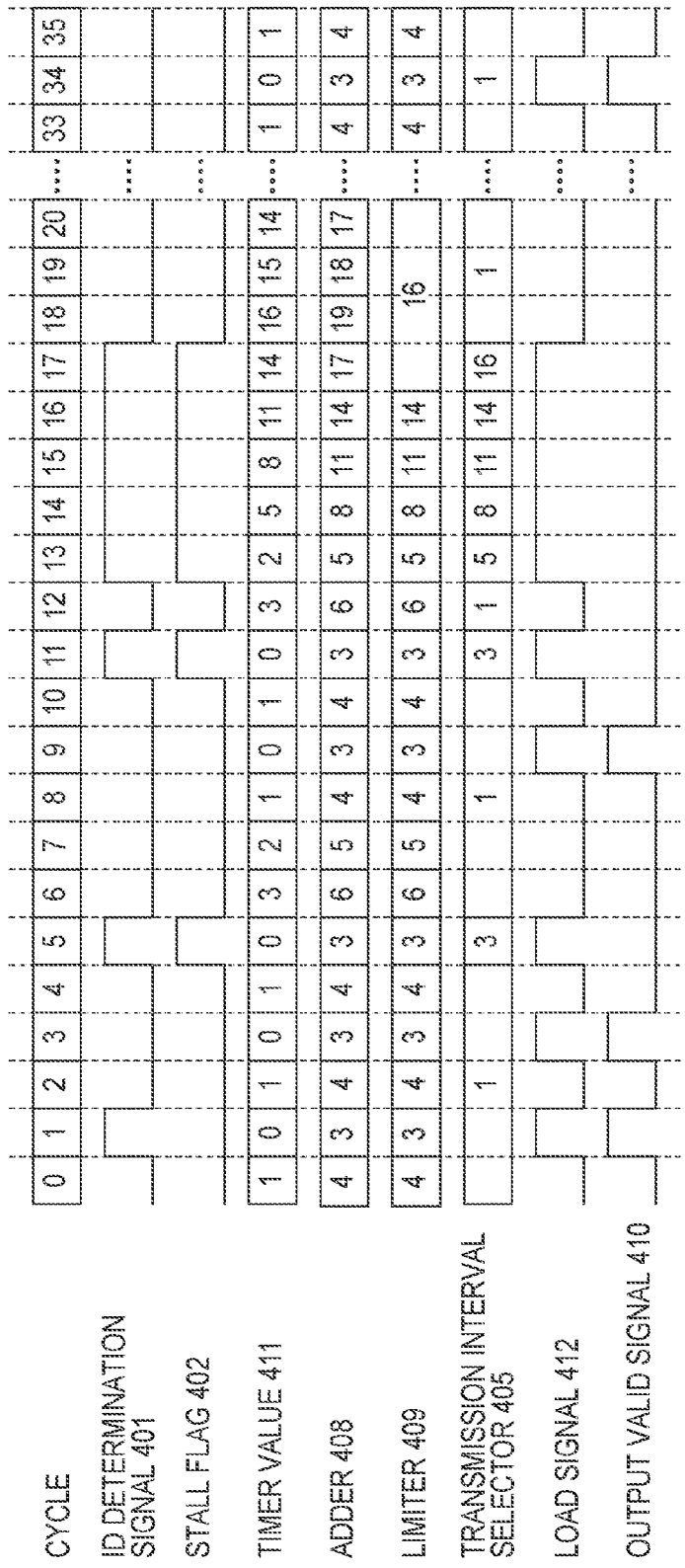
FIG. 6 is a chart showing the operation of the transmission interval controller according to the first embodiment.

The operation of the transmission interval controller 303 will be described below with reference to FIG. 6. This embodiment will explain a case in which the number of modules in FIG. 1 is n=16. The limiter 409 limits an output value of the adder 408 to be equal to or smaller than "16" corresponding to one round of the ring bus 102.

In this case, a state of the ring bus 102 is not taken into consideration, for the sake of simplicity. That is, assume that there is no situation in which the ring bus 102 is filled with valid packets, and when the timer 403 is "0", a packet can be transmitted from the second buffer 302. Note that although not described in the following explanation, when transmission slots on the ring bus 102 are not empty, that is, when the valid flag 201 of a received packet is valid, and that received packet is required to be transferred, a packet cannot be transmitted from the second buffer 302. In addition to such case, when a packet cannot be transmitted, the timer 403 suspends loading of a value of the first register 406, and maintains "0". However, when the Stall flag 402 is "1" and the ID determination signal 401 is "1", the transmission interval selector 405 loads a value of the limiter 409 even in a state in which the timer 403 maintains "0" as in the above case.

As initial settings, a CPU (not shown) or the like sets values of the first and second registers 406 and 407. In this embodiment, for example, "1" is set in the first register 406, and "3" is set in the second register 407. Also, values of the ID determination signal 401, Stall flag 402, and timer value 411 in cycle 0 are respectively set to be "0", "0", and "1". Furthermore, assume that the ID determination signal 401 and Stall flag 402 transit, as shown in FIG. 6.

In cycle 0, both the ID determination signal 401 and Stall flag 402 are "0". That is, a received packet is not that transmitted from the self module, and its process is not suspended. In this case, since the timer value 411 is "1", a timer loading operation is not required, and the load signal 412 is "0". For this reason, the timer 403 executes a down-count operation without loading any value selected by the transmission interval selector 405, and reaches "0" in next cycle 1. Also, the output valid signal 410 is "0" indicating "invalid" since the timer value 411 is not "0". Note that the output of the adder 408 is "4" as a sum of the timer value 411 ("1") and the value ("3") of the second register 407. The output of the limiter 409 is "4" since the limit value "16" is not reached, and the value of the adder 408 is output intact. The transmission interval selector 405 selects the value "1" stored in the first register 406 since both the ID determination signal 401 and Stall flag 402 are not "1". That is, in this cycle, since no packet transmitted by the self module 101 is returned while being suspended by another module, and the timer value is not "0", a value loading operation to the timer and a packet output operation from the second buffer 302 are skipped.

In cycle 1, the ID determination signal 401 is "1", and the Stall flag 402 is "0". That is, in this state, the module 101 receives a packet transmitted by itself, but its process is not suspended by another module. In this case, since the packet transmitted by itself is unnecessary, that packet is cleared to form an empty packet. Note that since the timer value 411 is "0", the load signal 412 changes to "1" irrespective of the values of the ID determination signal 401 and Stall flag 402, and a value selected by the transmission interval selector 405 is loaded to the timer 403 in the next cycle. Since the ID determination signal is "1" but the Stall flag 402 is not "1", the transmission interval selector 405 selects the value "1" stored in the first register 406. Note that the output of the adder 408 is "3" as a sum of the timer value 411 ("0") and the value ("3") of the second register 407. The output of the limiter 409 is "3" since the limit value "16" is not reached, and the value of the adder 408 is output intact. The output valid signal 410 is "1" since the timer value 411 is "0". That is, in this cycle, since the timer value is "0", and both the ID determination signal 401 and Stall flag 402 are not "1", the predetermined setting value stored in the first register 406 is loaded to the timer, and a packet is output from the second buffer 302.

In cycle 2, both the ID determination signal 401 and Stall flag 402 are "0" as in cycle 0. For this reason, the load signal 412, the output valid signal 410, the output of the adder 408, that of the limiter 409, and that of the transmission interval selector 405 are respectively "0", "0", "4", "4", and "1". The timer 403 counts down from "1", and reaches "0" in next cycle 3.

In cycle 3, the ID determination signal 401 is "0", and the Stall flag 402 is "0". However, since the timer value 411 is "0", the load signal 412 changes to "1", and a value is loaded to the timer 403 in the next cycle 4. The output valid signal 410 changes to "1" since the timer value 411 is "0" and both the ID determination signal 401 and Stall flag are not "1". Note that the output of the adder 408 assumes "3" as a sum of the timer value 411 ("0") and the value ("3") of the second register 407, and the output of the limiter 409 is "3" since the limit value "16" is not reached, and the value of the adder 408 is output intact. Since both the Stall flag 402 and ID determination signal 401 are "0", the transmission interval selector 405 selects the value of the first register 406, and outputs "1".

In cycle 4, both the ID determination signal 401 and Stall flag 402 are "0" as in cycle 0. For this reason, the load signal 412, the output valid signal 410, the output of the adder 408, that of the limiter 409, and that of the transmission interval selector 405 are respectively "0", "0", "4", "4", and "1". Also, the timer 403 counts down from "1", and reaches "0" in next cycle 5.

In cycle 5, ID determination signal 401 is "1", and the Stall flag 402 is "1". That is, in this state, the process of a packet output from the module 101 is suspended by another module 101, which is to execute a process after the self module, and that packet is returned. For this reason, the load signal 412 changes to "1" to load a value selected by the transmission interval selector 405 to the timer 403 in next cycle 6. Note that the output of the adder 408 is "3" as a sum of the timer value 411 ("0") and the value ("3") of the second register 407. The output of the limiter 409 is "3" since the limit value "16" is not reached, and the value of the adder 408 is output intact. Since the ID determination signal 401 is "1" and the Stall flag 402 is "1", the transmission interval selector 405 selects the value of the limiter 409, and outputs "3". Also, since the timer value 411 is "0", but both the ID determination signal 401 and Stall flag 402 are "1", the output valid signal 410 is "0". That is, in this cycle, since it is detected that the received packet is that output from the self module, and its process is suspended by the module which is to execute the process after the self module, the value "3" larger than the value of the first register 406 is loaded to the timer in next cycle 6, thereby extending a transmission interval. Note that the counter value is "0", but since the received suspended packet is valid and is required to be transferred, a packet output operation from the second buffer 302 is skipped.

In cycles 6 to 8, both the ID determination signal 401 and Stall flag 402 are "0" as in cycle 0. For this reason, the load signal 412, the output valid signal 410, the outputs of the adder 408, those of the limiter 409, and those of the transmission interval selector 405 are respectively "0", "0", "6" to "4", "6" to "4", and "1". Also, the timer 403 counts down from "3", and reaches "0" in next cycle 9.

In cycle 9, both the ID determination signal 401 and Stall flag 402 are "0", and the timer value 411 is "0" as in cycle 3. For this reason, the load signal 412 changes to "1", and a value is loaded to the timer 403 in next cycle 10. The output valid signal 410 changes to "1". Note that the output of the adder 408 is "3" as a sum of the timer value 411 ("0") and the value ("3") of the second register 407. The output of the limiter 409 is "3" since the limit value "16" is not reached, and the value of the adder 408 is output intact. Since the Stall flag 402 is not "1", the transmission interval selector 405 selects the first register 406, and outputs "1". That is, in this cycle, the received packet is not a suspended packet. However, since the timer value 411 is "0", the predetermined setting value stored in the first register 406 is loaded to the timer, and a packet is output from the second buffer 302.

In cycle 10, both the ID determination signal 401 and Stall flag 402 are "0" as in cycle 0. For this reason, the load signal 412, the output valid signal 410, the output of the adder 408, that of the limiter 409, and that of the transmission interval selector 405 are respectively "0", "0", "4", "4", and "1". The timer 403 counts down from "1", and reaches "0" in next cycle 11.

In cycle 11, the ID determination signal 401 is "1", and the Stall flag 402 is "1" as in cycle 5. For this reason, the load signal 412, the output valid signal 410, the output of the adder 408, that of the limiter 409, and that of the transmission interval selector 405 are respectively "1", "0", "3", "3", and "3". In next cycle 12, "3" is loaded to the timer 403.

In cycle 12, both the ID determination signal 401 and Stall flag 402 are "0" as in cycle 0. For this reason, the load signal 412, the output valid signal 410, the output of the adder 408, that of the limiter 409, and that of the transmission interval selector 405 are respectively "0", "0", "6", "6", and "1". The timer 403 counts down from "3", and reaches "2" in next cycle 13.

In cycle 13, since the ID determination signal 401 is "1" and the Stall flag 402 is "1", the load signal 412 changes to "1", and a value is loaded to the timer 403 in next cycle 14. Note that the output of the adder 408 is "5" as a sum of the timer value 411 ("2") and the value ("3") of the second register 407. The output of the limiter 409 is "5" since the limit value "16" is not reached, and the value of the adder 408 is output intact. Since the ID determination signal 401 is "1" and the Stall flag 402 is "1", the transmission interval selector 405 selects the limiter 409, and outputs "5". Also, the output valid signal 410 is set to "0" since the timer value 411 is not "0". That is, in this cycle, to be continued from cycle 11, the module 101 receives a packet which was output by itself, and is returned after it was suspended by a module which is to subsequently process that packet. When a plurality of packets for which both the ID determination signal 401 and Stall flag 402 are "1" are received in a short term, many processes are stalled in the module which is to subsequently process these packets. For this reason, a longer time is loaded to the timer 403 to recover the suspended processes. For this purpose, the sum "5" of the timer value and the to-be-added value, which is stored in the second register 407 and is used to dynamically control a transmission interval, is loaded to the timer in next cycle 14, thus further extending the transmission interval.

In cycles 14 to 16, the transmission interval is sequentially extended as in cycle 13. The outputs of the load signal 412 and output valid signal 410 are respectively "1" and "0", and the output of the adder 408, that of the limiter 409, and that of the transmission interval selector 405 respectively change to "8", "11", and "14". To the timer 403, the output of the limiter 409 is loaded for respective cycles, and intervals to be loaded are added in increments of the value "3" of the second register 407 like "5", "8", and "11". Then, the interval to be loaded becomes "14" in cycle 17. In these cycles, a plurality of packets, which were transmitted by the module 101, are suspended by another module which is to subsequently process these packets, and the frequency of occurrence of suspended packets is high. Hence, the sum of the to-be-added value stored in the second register 407 and the timer value is loaded to the timer to extend the transmission interval step by step.

In cycle 17, the same operations as in cycle 13 are executed. However, since the output of the adder 408 is "17" larger than "16", the limiter 409 limits that value to "16". That is, the load signal 412, the output valid signal 410, the output of the adder 408, that of the limiter 409, and that of the transmission interval selector 405 are respectively "1", "0", "17", "16", and "16". In next cycle 18, "16" is loaded to the timer 403.

In cycles 18 to 33, both the ID determination signal 401 and Stall flag 402 are "0" as in cycle 0. For this reason, the load signal 412, output valid signal 410, and the output of the transmission interval selector 405 are respectively "0", "0", and "1". The outputs of the adder 408 are "19" to "4", and the outputs of the limiter 409 are "16" when the output of the adder 408 is equal to or larger than "16", or the same values as the outputs of the adder 408 in other cases. The timer 403 counts down from "16", and reaches "0" in cycle 34. That is, in these cycles, since packets output by the module 101 are not returned after their processes are suspended by another module 101, which is to subsequently execute a process, the down-count operation is executed until the timer value 411 becomes "0". Thus, the module 101 stops a packet output operation from the second buffer 302 until the timer value 411 becomes "0" to wait until suspension of processes in another module 101 which is to subsequently execute the process is recovered. Thus, a deadlock and an efficiency drop caused by the ring bus 102 filled with valid packets whose processes are suspended can be avoided.

Cycle 34 has the same conditions as in cycle 3. That is, the load signal 412, the output valid signal 410, the output of the adder 408, that of the limiter 409, and that of the transmission interval selector 405 are respectively "1", "1", "3", "3", and "1". In next cycle 35, "1" is loaded to the timer 403.

As described above, when the module 101 detects that packets output by itself are returned after their processes are suspended by other modules 101 which are to subsequently process those packets, the transmission interval of a packet from the second buffer 302 is dynamically controlled according to the frequency of occurrence of those packets. For other packets, every time the timer 403 reaches "0", the predetermined value as the minimum packet transmission interval is loaded, thus guaranteeing the minimum packet output interval. With these control operations, packets can be output at intervals at which other modules 101 which subsequently execute processes can receive these packets. Also, with these control operations, the packet transfer efficiency can be improved by suppressing occurrence of suspended packets from other modules 101 which subsequently execute processes.

Second Embodiment

Figure 7:
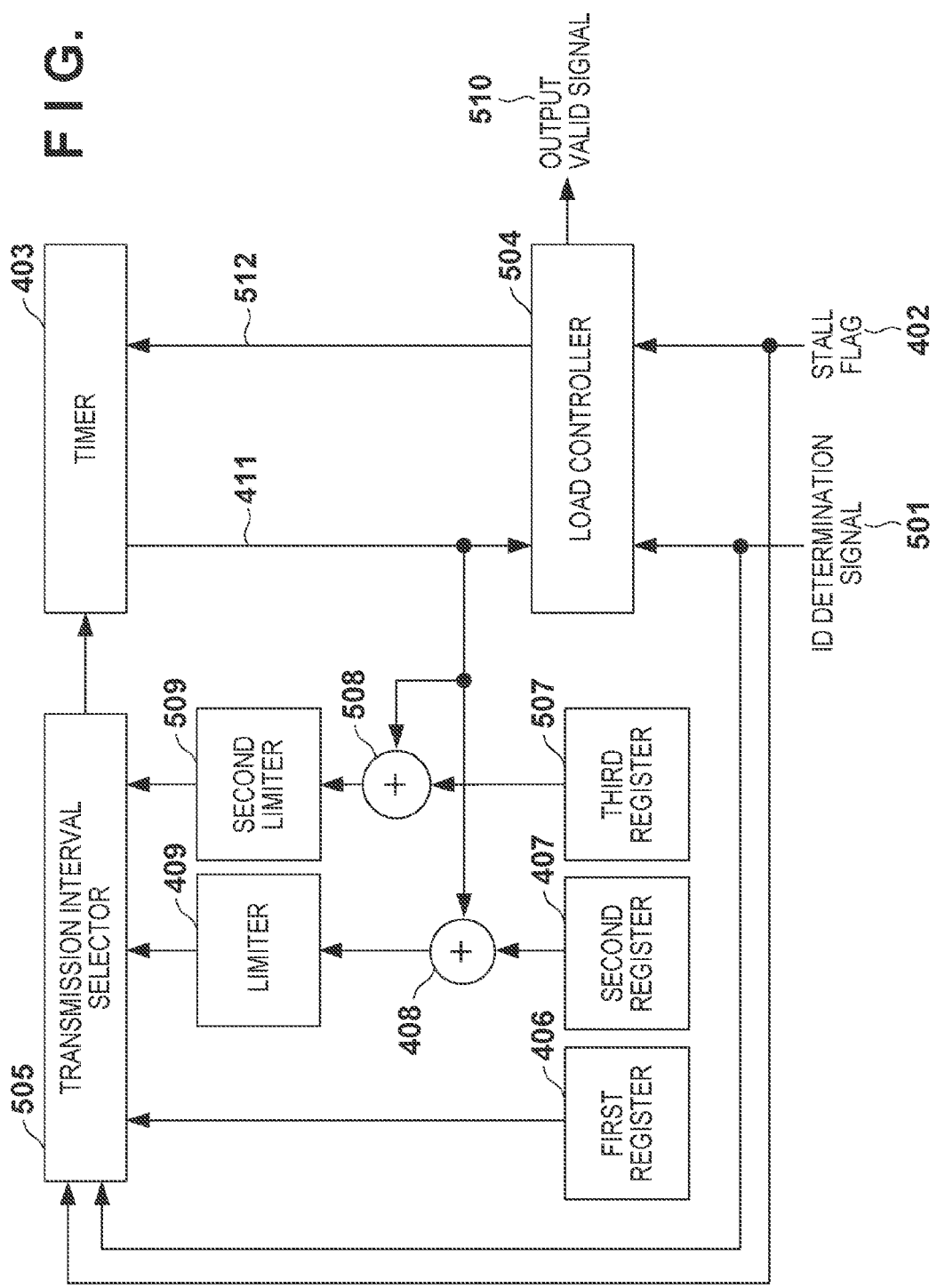
FIG. 7 is a block diagram showing the arrangement of a transmission interval controller according to the second embodiment.

A data-path control system according to the second embodiment of the present invention will be described below. Since the arrangements associated with FIGS. 1 to 4 are the same as those in the first embodiment, a description thereof will not be repeated. The arrangement of the transmission interval controller 303 according to this embodiment will be described below with reference to FIG. 7. Note that the same reference numerals in FIG. 7 denote blocks having the same functions as those in FIG. 5, and a description thereof will not be repeated.

(Second Arrangement Example of Transmission Interval Controller)

Figure 5:
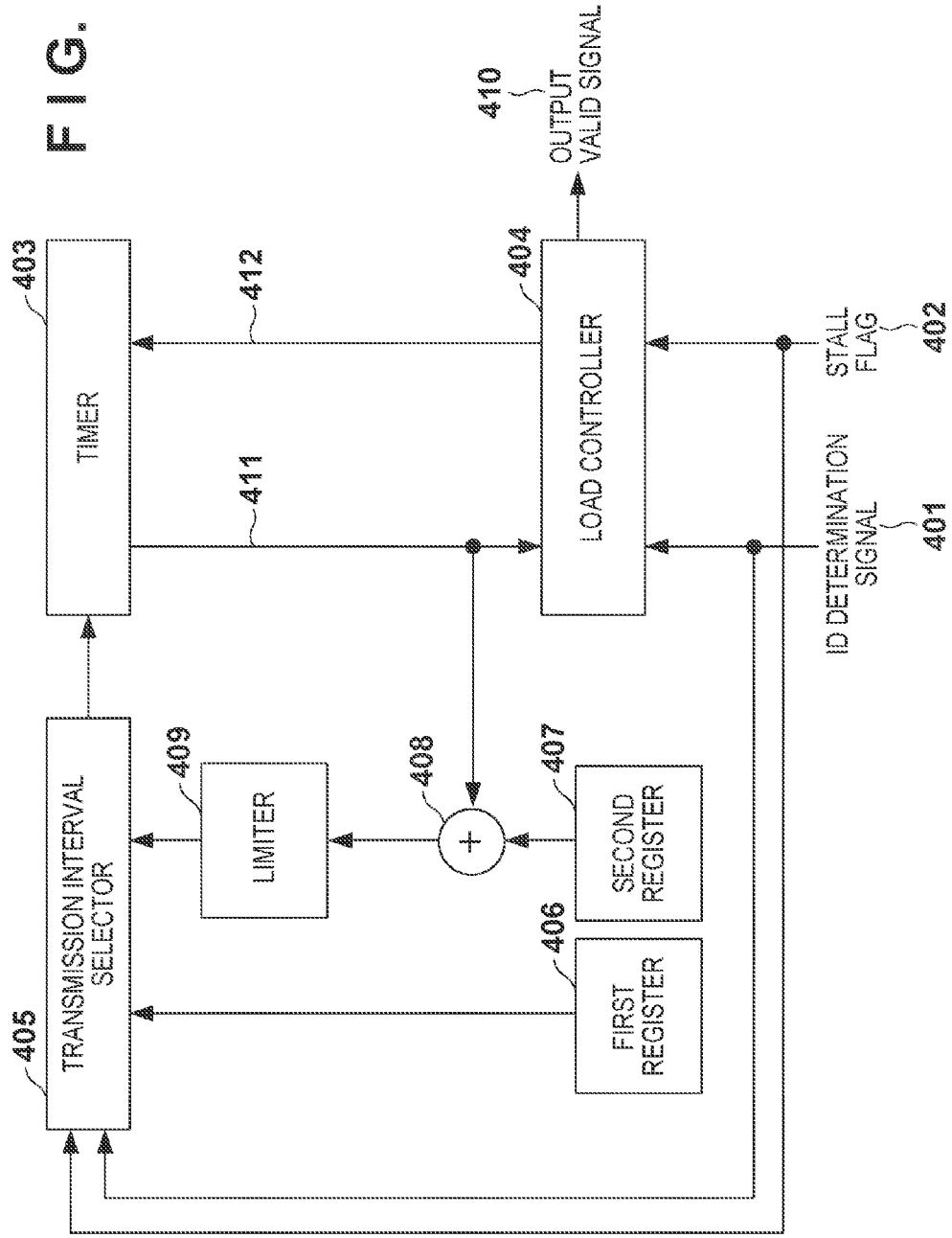
FIG. 5 is a block diagram showing the arrangement of a transmission interval controller according to the first embodiment.

An ID determination signal 501 is input from the ID determination unit 111 as in the example of FIG. 5. When the node ID 202 of a received packet is equal to the value of the node ID register 104, that is, when it indicates that the packet was output by the self module, the ID determination signal 501 assumes a value "01". Note that "" indicates a 2-bit value . Also, when the node ID 202 of a received packet indicates that data of that packet was processed after the self module, the ID determination signal 501 assumes a value "10". In other cases, the ID determination signal 501 assumes a value "00". Note that it is assumed that node IDs are assigned in ascending order in turn from the upstream side of processes, and whether or not a module is located on the downstream side of the self module is determined by comparing the node ID 202 of a packet with the value stored in the node ID register 104. That is, when the node ID 202 of a received packet is larger than the value of the node ID register 104, it is judged that the received packet is a packet which was transmitted after it was processed in downstream modules. If the Valid flag 201 indicates "invalid" irrespective of the value of the node ID 202, "00" is output.

Reference numeral 504 denotes a load controller which controls loading of a transmission interval to the timer 403. The load controller 504 receives the ID determination signal 501, Stall flag 402, and timer value 411, and outputs an output valid signal 510 and load signal 512. For the sake of simplicity, assume that a packet can be transmitted from the second buffer 302 when the timer 403 is "0".

A transmission interval selector 505 selects the output of the limiter 409 as a transmission interval to be loaded to the timer 403 when the ID determination signal 501 is "01" and the Stall flag 402 is "1". Also, the transmission interval selector 505 selects an output of a second limiter 509 (to be described later) when the ID determination signal 501 is "10" and the Stall flag 402 is "1". In other cases, the transmission interval selector 505 selects the value of the first register 406. That is, unlike in the first embodiment, even when other modules 101, which execute processes after the self process, suspend the processes, the module 101 extends a transmission interval of a packet from the second buffer 302. That is, transmission is waited until suspension of processes in not only another module 101 which executes a process immediately after the module 101 but also in other modules which execute further downstream processes is recovered. Then, a deadlock probability can be further reduced, and the throughput of the whole system can be improved.

A third register 507 is a register which sets a to-be-added value required to dynamically control a transmission interval upon detection of suspended packets from modules which execute processes after the self module. In this case, the second register 407 stores a first predetermined value, and the third register 507 stores a second predetermined value, which is different from the first predetermined value. Note that the first predetermined value can assume a value larger than the second predetermined value, since a process is suspended by the module which executes a process immediately after the self module. Conversely, the second predetermined value is used to extend a packet transmission interval when processes are suspended by the modules which execute processes after the process immediately after the self module. Therefore, in upstream modules, a frequency of extending a transmission interval using the second predetermined value becomes higher than downstream modules. For this reason, an amount of a transmission interval to be extended by each individual module need not be large, and may assume a small value. A second adder 508 adds the timer value 411 and the value of the third register 507 as in the adder 408. As in the limiter 409, a second limiter 509 limits the output value of the second adder 508 to be equal to or smaller than a predetermined value. The predetermined value indicates, for example, a period corresponding to one round of the ring bus 102. An output valid signal 510 is output from the load controller 504 to the second buffer 302 so as to control an output interval. The output valid signal 510 assumes a value "1" indicating "valid" for a case in which the timer value 411 is "0" and the ID determination signal 501 is not "01" or "10", or the timer value 411 is "0" and the Stall flag 402 is not "1". The output valid signal 510 assumes "0" in other cases. That is, even when the timer value 411 is "0", and the Stall flag 402 is "1", when the ID determination signal 501 is "00", the output valid signal 510 is "1". On the other hand, even when the timer value 411 is "0", when the Stall flag 402 is "1", and the ID determination signal 501 is "01" or "10", the output valid signal 510 is "0". A load signal 512 is used to control a load timing of an output interval from the load controller 504 to the timer 403. The load signal 512 assumes a valid value "1" when the timer value 411 is "0" or when the Stall flag 402 is "1" and the ID determination signal 501 is "01" or "10". In other cases, the load signal 512 assumes "0".

(Second Operation Example of Transmission Interval Controller)

Figure 8:
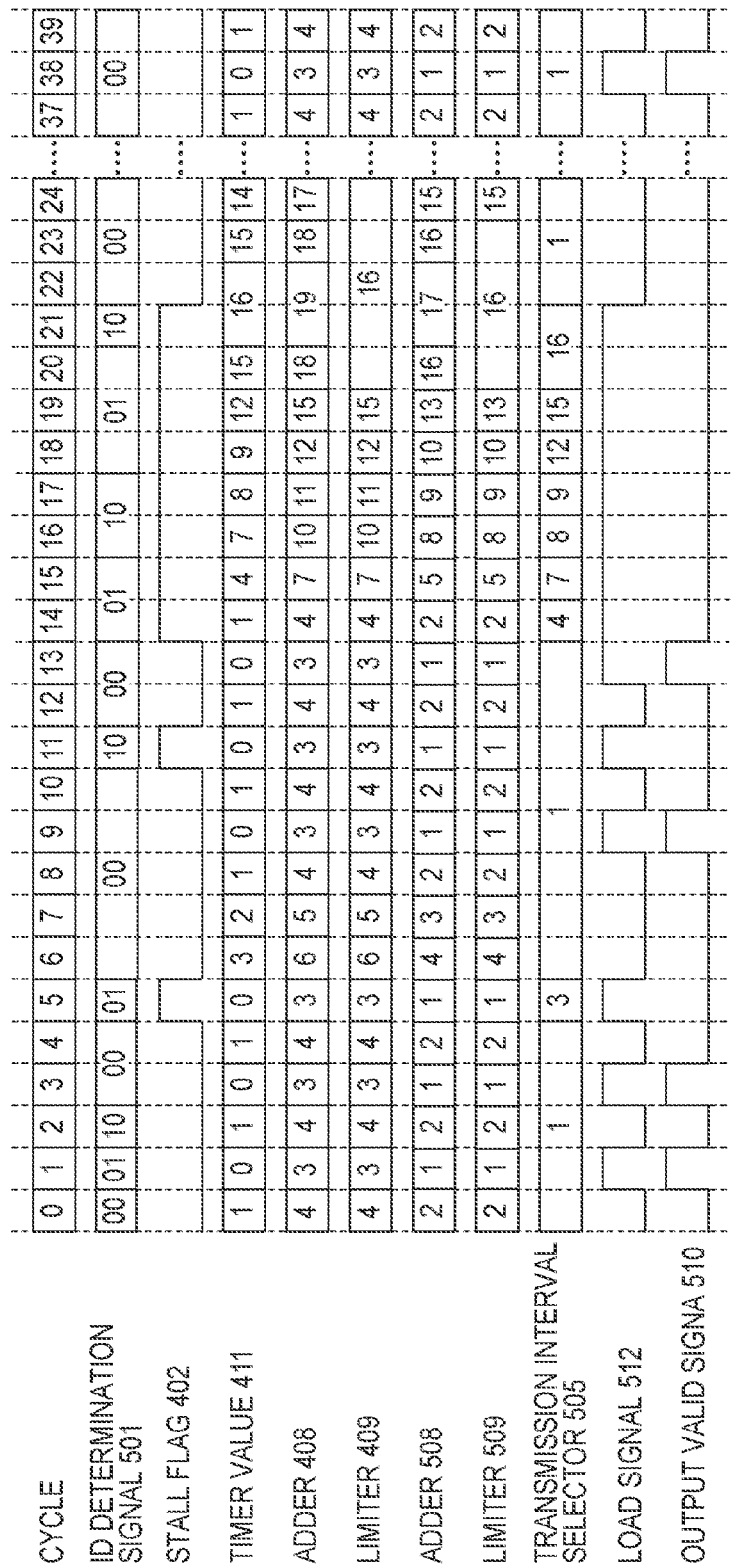
FIG. 8 is a chart showing the operation of the transmission interval controller according to the second embodiment.

The operation of the transmission interval controller 303 according to this embodiment will be described below with reference to FIG. 8. This embodiment will explain a case in which the number n of modules in FIG. 1 is 16 as in the first embodiment. Therefore, the limiters 409 and 509 limit the output values of the adders 408 and 508 to "16" corresponding to one round of the ring bus.

As initial settings, a CPU (not shown) or the like sets values in the first register 406, second register 407, and third register 507. For example, in this embodiment, "1" is set in the first register 406, "3" is set in the second register 407, and "1" is set in the third register 507. Also, the values of the ID determination signal 501, Stall flag 402, and timer 403 in cycle 0 are respectively "00", "0", and "1".

In cycle 0, since the ID determination signal 501 is "00" and the Stall flag 402 is "0", the load signal 512 is "0", and the timer 403 counts down from "1" and reaches "0" in next cycle 1. Also, the output valid signal 510 is "0" since the timer value 411 is not "0". Note that the output of the adder 408 is "4" as a sum of the timer value 411 ("1") and the value ("3") of the second register 407. The output of the limiter 409 is "4" since the limit value "16" is not reached, and the value of the adder 408 is output intact. Also, the output of the second adder 508 is "2" as a sum of the timer value 411 ("1") and the value ("1") of the third register 507. The output of the second limiter 509 is "2" since the limit value "16" is not reached, and the value of the second adder 508 is output intact. Since the ID determination signal 501 is neither "01" nor "10", and the Stall flag 402 is not "1", the transmission interval selector 505 selects the first register 406, and outputs "1". That is, in this cycle, since the received packet is not a suspended packet, and the timer value is not "0", a value load operation to the timer and a packet output operation from the second buffer 302 are skipped.

In cycle 1, the ID determination signal 501 is "01", and the Stall flag 402 is "0". That is, the module 101 receives a packet transmitted by itself, but a process is not suspended. On the other hand, the timer value 411 is "0". For this reason, the load signal 512 changes to "1", and a value is loaded to the timer 403 in next cycle 2. The output valid signal 510 is "1" since the timer value 411 is "0" and the Stall flag 402 is not "1", or the timer value 411 is "0" and the ID determination signal 501 is not "01" or "10". Note that the output of the adder 408 is "3" as a sum of the timer value 411 ("0") and the value ("3") of the second register 407. The output of the limiter 409 is "3" since the limit value "16" is not reached, and the value of the adder 408 is output intact. Also, the output of the second adder 508 is "1" as a sum of the timer value 411 ("0") and the value ("1") of the third register 507. The output of the second limiter 509 is "1" since the limit value "16" is not reached, and the value of the second adder 508 is output intact. The transmission interval selector 505 selects the value "1" of the first register 406 since the Stall flag 402 is not "1". That is, in this cycle, since a received packet is not a suspended packet, but the timer value is "0", the predetermined value stored in the first register 406 is loaded to the timer 403, and a packet is output from the second buffer 302.

Cycle 2 is the same as cycle 0, except that the ID determination signal 501 is "10". The load signal 512, the output valid signal 510, the output of the adder 408, that of the limiter 409, that of the second adder 508, that of the second limiter 509, and that of the transmission interval selector 505 are respectively "0", "0", "4", "4", "2", "2", and "1". Also, the timer 403 counts down from "1", and reaches "0" in next cycle 3.

In cycle 3, the ID determination signal 501 is "00", and the Stall flag 402 is "0". However, since the timer value 411 is "0", the load signal 512 changes to "1", and a value is loaded to the timer 403 in next cycle 4. The output valid signal 510 is "1" since the timer value 411 is "0" and the Stall flag 402 is not "1", or the timer value 411 is "0" and the ID determination signal 501 is "01" or "10". Note that the output of the adder 408 is "3" as a sum of the timer value 411 ("0") and the value ("3") of the second register 407. The output of the limiter 409 is "3" since the limit value "16" is not reached, and the value of the adder 408 is output intact. Also, the output of the second adder 508 is "1" as a sum of the timer value 411 ("0") and the value ("1") of the third register 507. The output of the second limiter 509 is "1" since the limit value "16" is not reached, and the value of the second adder 508 is output intact. The transmission interval selector 505 selects the value "1" of the first register 406 since the Stall flag 402 is "1" but the ID determination signal 501 is "00". That is, in this cycle, a received packet is a suspended packet, but it is not a packet, which is output by a module on the processing path after the self module and is suspended. However, since the timer 403 value is "0", the predetermined value, which is stored in the first register 406 and is required to guarantee the minimum packet transmission interval, is loaded to the timer, and a packet is output from the second buffer 302.

Cycle 4 is the same as cycle 0. The load signal 512, the output valid signal 510, the output of the adder 408, that of the limiter 409, that of the second adder 508, that of the second limiter 509, and that of the transmission interval selector 505 are respectively "0", "0", "4", "4", "2", "2", and "1". Also, the timer 403 counts down from "1", and reaches "0" in next cycle 5.

In cycle 5, the ID determination signal 401 is "01", and the Stall flag 402 is "1". Also, since the timer value 411 is "0", the load signal 512 changes to "1", and a value is loaded to the timer 403 in next cycle 6. The output valid signal 510 changes to "0", since the timer value 411 is "0", but the Stall flag 402 is "1" and the ID determination signal 501 is "01" or "10". Note that the output of the adder 408 is "3" as a sum of the timer value 411 ("0") and the value ("3") of the second register 407. The output of the limiter 409 is "3" since the limit value "16" is not reached, and the value of the adder 408 is output intact. Also, the output of the second adder 508 is "1" as a sum of the timer value 411 ("0") and the value ("1") of the third register 507. The output of the second limiter 509 is "1" since the limit value "16" is not reached, and the value of the second adder 508 is output intact. Since the ID determination signal 501 is "01" and the Stall flag 402 is "1", the transmission interval selector 505 selects the limiter 409, and outputs "3". That is, in this cycle, a packet transmitted by the module 101 itself is returned after its process was suspended by the module 101 which is to subsequently execute the process. Hence, a sum "3" of the to-be-added value stored in the second register 407 and the timer value is loaded to the timer in next cycle 6 to extend a transmission interval. Note that although the timer value 411 is "0", since the suspended packet is located on the ring bus 102, no packet is output from the second buffer 302.

Cycles 6 to 8 are the same as cycle 0. The load signal 512, the output valid signal 510, the outputs of the adder 408, and those of the limiter 409 are respectively "0", "0", "6" to "4", and "6" to "4". Also, the outputs of the second adder 508, those of the second limiter 509, and those of the transmission interval selector 505 are respectively "4" to "2", "4" to "2", and "1". Also, the timer 403 counts down from "3", and reaches "0" in next cycle 9.

Cycle 9 is the same as cycle 3. The load signal 512, the output valid signal 510, the output of the adder 408, and that of the limiter 409 are respectively "1", "1", "3", and "3". Also, the output of the second adder 508, that of the second limiter 509, and that of the transmission interval selector 505 are respectively "1", "1", and "1". In next cycle 10, the setting value of the first register 406 is loaded to the timer, and a packet is output from the second buffer 302.

Cycle 10 is the same as cycle 0. The load signal 512, the output valid signal 510, the output of the adder 408, that of the limiter 409, that of the second adder 508, that of the second limiter 509, and that of the transmission interval selector 505 are respectively "0", "0", "4", "4", "2", "2", and "1". Also, the timer 403 counts down from "1", and reaches "0" in next cycle 11.

In cycle 11, the ID determination signal 401 is "10", and the Stall flag 402 is "1". Furthermore, since the timer value 411 is "0", the load signal 512 changes to "1", and a value is loaded to the timer 403 in next cycle 12. The output valid signal 510 is set to "0", since the timer value 411 is "0", but the Stall flag 402 is "1" and the ID determination signal 501 is "10". Note that the output of the adder 408 is "3" as a sum of the timer value 411 ("0") and the value ("3") of the second register 407. The output of the limiter 409 is "3" since the limit value "16" is not reached, and the value of the adder 408 is output intact. Also, the output of the second adder 508 is "1" as a sum of the timer value 411 ("0") and the value ("1") of the third register 507. The output of the second limiter 509 is "1" since the limit value "16" is not reached, and the value of the second adder 508 is output intact. Since the ID determination signal 501 is "10" and the Stall flag 402 is "1", the transmission interval selector 505 selects the value of the second limiter 509, and outputs "1". That is, in this cycle, the module 101 receives a packet whose process was suspended in another module 101 which executes a process after the self module. Hence, a sum "1" of the to-be-added value stored in the third register 507 and the timer value is loaded to the timer in next cycle 12 to dynamically extend a transmission interval. Note that although the timer value 411 is "0", since a suspended packet is located on the ring bus 102, no packet is output from the second buffer 302.

Cycle 12 is the same as cycle 0. The load signal 512, the output valid signal 510, the output of the adder 408, that of the limiter 409, that of the second adder 508, that of the second limiter 509, and that of the transmission interval selector 505 are respectively "0", "0", "4", "4", "2", "2", and "1". Also, the timer 403 counts down from "1", and reaches "0" in next cycle 13.

Cycle 13 is the same as cycle 3. The load signal 512, the output valid signal 510, the output of the adder 408, that of the limiter 409, that of the second adder 508, that of the second limiter 509, and that of the transmission interval selector 505 are respectively "1", "1", "3", "3", "1", "1", and "1". In next cycle 14, the setting value of the first register 406 is loaded to the timer, and a packet is output from the second buffer 302.

Cycles 14 and 15 are the same as cycle 5. The load signal 512, the output valid signal 510, the outputs of the adder 408, and those of the limiter 409 are respectively "1", "0", "4" to "7", and "4" to "7". Also, the outputs of the second adder 508, those of the second limiter 509, and those of the transmission interval selector 505 are respectively "2" to "5", "2" to "5", and "4" to "7". Furthermore, the output of the limiter 409 is loaded to the timer 403 for respective cycles, and a transmission interval is extended in increments of the value "3" of the second register 407 like "1" to "4" and "4" to "7". That is, in these cycles, a packet, which was output by the module 101 and is returned after it was suspended by the module 101 which is to execute a next process, is received. For this reason, a sum of the to-be-added value stored in the second register 407 and the timer value is loaded to the timer, thereby dynamically extending a transmission interval.

Cycles 16 and 17 are the same as cycle 11. The load signal 512, the output valid signal 510, the outputs of the adder 408, and those of the limiter 409 are respectively "1", "0", "10" to "11", and "10" to "11". Also, the outputs of the second adder 508, those of the second limiter 509, and those of the transmission interval selector 505 are respectively "8" to "9", "8" to "9", and "8" to "9". Furthermore, the output of the second limiter 509 is loaded to the timer 403 for respective cycles, and a transmission interval is extended in increments of the value "1" of the third register 507 like "7" to "8" and "8" to "9". That is, in these cycles, a packet, which was output by another module 101 which executes a process after the module 101 and was suspended, is received. For this reason, a sum of the to-be-added value stored in the third register 507 and the timer value is loaded to the timer, thereby dynamically extending a transmission interval.

Cycles 18 and 19 are the same as cycle 5. The load signal 512, the output valid signal 510, the outputs of the adder 408, and those of the limiter 409 are respectively "1", "0", "12" to "15", and "12" to "15". Also, the outputs of the second adder 508, those of the second limiter 509, and those of the transmission interval selector 505 are respectively "10" to "13", "10" to "13", and "12" to "15". Furthermore, the output of the limiter 409 is loaded to the timer 403 for respective cycles, and a transmission interval is extended in increments of the value "3" of the second register 407 like "9" to "12" and "12" to "15".

Cycle 20 has the same condition as in cycle 5. However, since the output of the adder 408 is larger than "16", it is limited to "16" by the limiter 409, and the limited value is output. That is, the output of the adder 408, that of the limiter 409, that of the second adder 508, that of the second limiter 509, and that of the transmission interval selector 505 are respectively "18", "16", "16", "16", and "16". Note that the load signal 512 and output valid signal 510 are respectively "1" and "0". In next cycle 21, "16" is loaded to the timer 403.

Cycle 21 is the same as cycle 11. However, since the output of the second adder 508 is larger than "16", it is limited to "16" by the second limiter 509, and the limited value is output. That is, the output of the adder 408, that of the limiter 409, that of the second adder 508, that of the second limiter 509, and that of the transmission interval selector 505 are respectively "19", "16", "17", "16", and "16". The load signal 512 and output valid signal 510 are respectively "1" and "0". In next cycle 22, "16" is loaded to the timer 403.

Cycles 22 to 37 are the same as cycle 0. The load signal 512, the output valid signal 510, the outputs of the adder 408, and those of the limiter 409 are respectively "0", "0", "19" to "4", and "16" to "4". Also, the outputs of the second adder 508, those of the second limiter 509, and those of the transmission interval selector 505 are respectively "17" to "2", "16" to "2", and "1". Furthermore, the timer 403 counts down from "16", and reaches "0" in cycle 38. That is, in these cycles, since packets whose processes were suspended by other modules are not received, a packet output operation from the second buffer 302 is stopped until the timer counts down and reaches "0".

Cycle 38 has the same condition as in cycle 3. The load signal 512, the output valid signal 510, the output of the adder 408, that of the limiter 409, that of the second adder 508, that of the second limiter 509, and that of the transmission interval selector 505 are respectively "1", "1", "3", "3", "1", "1", and "1". In next cycle 39, "1" is loaded to the timer 403.

As described above, when the module 101 receives a packet, which was output by itself, and is returned after the process was suspended by the module 101 which is to execute a process immediately after the self module, it loads a value of a transmission interval, whose magnitude varies according to the frequency of occurrence of such packets, to the timer 403. Also, even when the module 101 receives a packet whose process was suspended not only the next module 101 but also by other modules 101 which are to execute processes after the next module, it loads a value of a transmission interval, whose magnitude varies according to the frequency of occurrence of such packets, to the timer 403. Furthermore, when the module 101 receives a packet other than the aforementioned packets, it loads the predetermined value of the minimum packet transmission interval every time a packet is output, thus setting a minimum packet output interval. With these control operations, occurrence of suspended packets from other modules 101, which execute processes after the self module, is detected, thereby dynamically increasing an output interval. In this way, in the plurality of modules 101 which execute processes before the module 101 which suspended the process, transmission intervals are extended, thus further improving the packet transfer efficiency. Especially, since the modules 101 which execute upstream processes have higher frequencies of occurrence of extension of output intervals, the stability of the ring bus 102 can be improved. That is, since the upstream modules 101 detect suspension of processes on the downstream side, and limit transmission of packets to be processed, thereby suppressing occurrence of packets whose processes are suspended, and improving the packet transfer efficiency as a whole. In particular, since the packet traffic is dynamically controlled according to the reception frequency of packets whose processes are suspended, the present invention can cope with even a case in which data processing performances of modules are not constant but they dynamically change.

Note that in order to effectively operate the control system according to this embodiment, the first predetermined value stored in the aforementioned second register 407 can be set to be larger than the second predetermined value stored in the third register 507. Since the second predetermined value is added as an output interval in each of the modules 101 which execute processes on the upstream side of the module 101 which suspended the process, even a small value can suffice to recover suspension of the processes. A value loaded to the timer at an output timing of a packet can be adjusted to a packet input interval of the next module. The limit value of the increment of the output interval can be set to be one round of the ring bus 102. This is because when the control waits for a period corresponding to one round of the ring bus 102, it can determine whether or not the suspended state is recovered. By setting the upper limit value in this manner, a response after the suspended state is recovered can be quickened, and a time in the input waiting state can be minimized.

In the above description, the packet output valid signal is determined based on the timer value. When an input buffer of the next module has an input buffer having a size for two or more packets, the timer may load a value selected by the transmission interval selector 505 without maintaining a value "0". In this case, output determination as to whether or not a packet cannot be output in a cycle in which the timer value is "0" is executed. When it is determined that a packet cannot be output, an output suspension flag, which is assured as information that advises accordingly, is set to be "1". Then, the timer loads a value selected by the transmission interval selector 505. Then, when the timer value is "0" or the output suspension flag is "1", the load controller 504 may set the output valid signal 510 to be "1" indicating "valid". In this case, a local minimum output interval is not guaranteed. However, a process is never suspended in the next module, thus allowing more efficient packet transfer. In the above embodiment, the down counter is used as the timer. Alternatively, an up counter may be arranged in place of the down counter to measure a set transmission interval.

In the above description, a single data path has been exemplified. However, the present invention is applicable to a multi data path. When the present invention is applied to the multi data path, a data path ID may be used to identify a data path and a packet to be processed in a packet format. In the above description, data are packetized/depacketized by the DMAC. Alternatively, a CPU may prepare a data packet and command packet in a DRAM, and may directly input them.

According to the present invention, in an information processing apparatus which executes data transfer using a ring bus, the number of data which are suspended without being processed on the ring bus can be suppressed, thereby improving the communication efficiency.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-114111 filed on May 20, 2011, which is hereby incorporated by reference herein in its entirety.

What is claimed is:

1. An information processing apparatus, which comprises a plurality of communication units connected to a bus in a ring shape, wherein two or more of the plurality of the communication units are connected to a respective one of two or more of processing units, which executes a predetermined process, and the two or more of processing units execute respective processes in a predetermined order to execute a sequence of processes for input data, a packet is transferred by each of the plurality of the communication units over the bus in one direction of the ring shape, and the packet goes round the bus once by passing through each of the plurality of communication units once, wherein each of the plurality of communication units receives the packet from an upstream communication unit in the one direction of the plurality of communication units and transfers the packet to a downstream communication unit in the one direction of the plurality of communication units, wherein the packet can hold data to be processed, identification information, and suspension information indicating whether or not one of the two or more of processing units that is to execute a corresponding process out of the respective processes on the data has suspended the corresponding process, wherein each of the plurality of communication units connected to the respective one of the two or more of processing units obtains, based on the identification information of a received packet, data held by the received packet and passes the obtained data to the respective one of the two or more of processing units, while the each of the plurality of communication units sets, in a case where the respective one of the two or more of processing units cannot obtain data included in the received packet, the suspension information of the received packet to a state indicating that a process for the data is suspended, and transfers the packet including the data that cannot be obtained, wherein the each of the plurality of communication units transfers the received packet without processing the data included in the received packet, in a case where the suspension information of the received packet indicates that the process for the data is suspended, wherein at least one of the plurality of communication units further comprises a first register that holds first identification information, sets identification information of a packet that holds data having been processed by a corresponding one of the two or more of processing units to the first identification information in a case of outputting the data having been processed by the corresponding one of the two or more of processing units, and transfers the packets at a predetermined transmission interval, wherein the at least one of the plurality of communication units comprises:

a determination unit configured to determine whether or not identification information of the received packet matches the first identification information;

a detection unit configured to detect whether or not the suspension information regarding the received packet indicates that the process for data held by the received packet is suspended; and a control unit configured to extend the transmission interval in a case where it is determined by the determination unit that the identification information of the received packet matches the first identification information held in the at least one of the plurality of communication units and it is detected by the detection unit that the suspension information regarding the received packet indicates that the process for data held by the received packet is suspended, wherein, in a case where it is determined that the identification information of a further received packet matches the first identification information held in the at least one of the plurality of communication units and it is detected that the suspension information regarding the further received packet indicates that the process for data held by the further received packet is suspended with a first predetermined period after the control unit extends the transmission interval, the control unit further extends the transmission interval by a second predetermined period smaller than the first predetermined period.

2. The apparatus according to claim 1, wherein said control unit limits the transmission interval so that the extended transmission interval is not more than the first predetermined period.

3. The apparatus according to claim 2, wherein the first predetermined period is a period in which a signal goes round the ring-shaped bus.

4. The apparatus according to claim 1, wherein in a case where there exist a first processing unit that is to execute the next process to that of the corresponding one of the two or more of processing units and a second processing unit that is to execute the next process to that of the first processing unit, the control unit extends the transmission interval by a longer time in a case where the first processing unit suspends the process on data held in the received packet than a time that is extended in a case where the second processing unit suspends the process on data held in the received packet.

5. The apparatus according to claim 4, wherein the determination unit further determines whether or not identification information of the received packet is information set by another one of the plurality of communication units that corresponds to another processing unit, which executes a more downstream process than the corresponding one of the two or more of processing units in the sequence of processes; and wherein the control unit extends the transmission interval by the first predetermined period in a case where it is determined that the identification information of the received packet matches the first identification information and it is detected that the suspension information regarding the received packet indicates that the process for data held by the received packet is suspended, and extends the transmission interval by the second predetermined period smaller than the first predetermined period in a case where it is determined that the identification information of the received packet is the information set by the other one of the plurality of communication units that corresponds to the other processing unit, which executes a more downstream process than the corresponding one of the two or more of processing units in the sequence of processes.

6. The apparatus according to claim 1, further comprising:
an output determination unit configured to determine whether or not the packet including data after the corresponding one of the two or more of processing units executed the process is transmitted at the predetermined transmission interval, wherein when it is determined that the packet including the data is not transmitted within the predetermined transmission interval, the packet including the data is transmitted irrespective of the transmission interval.

7. A communication method in an information processing apparatus, which comprises a plurality of communication units connected to a bus in a ring shape, wherein two or more of the plurality of the communication units are connected to a respective one of two or more of processing units, which executes a predetermined process, and the two or more of processing units execute respective processes in a predetermined order to execute a sequence of processes for input data, a packet is transferred by each of the plurality of the communication units over the bus in one direction of the ring shape, and the packet goes around the bus once by passing through each of the plurality of communication units once, wherein each of the plurality of communication units receives the packet from an upstream communication unit in the one direction of the plurality of communication units and transmits the packet to a downstream communication unit in the one direction of the plurality of communication units, wherein the packet can hold data to be processed, identification information, and suspension information indicating whether or not one of the two or more of processing units that is to execute a corresponding process out of the respective processes on the data has suspended the corresponding process, wherein each of the plurality of communication units connected to the respective one of the two or more of processing units obtains, based on the identification information of a received packet, data held by the received packet and passes the obtained data to the respective one of the two or more of processing units, while the each of the plurality of communication units sets, in a case where the respective one of the two or more of processing units cannot obtain data included in the received packet, the suspension information of the received packet to a state indicating that a process for the data is suspended, and transfers the packet including the data that cannot be obtained, wherein the each of the plurality of communication units transfers the received packet without processing the data included in the received packet, in a case where the suspension information of the received packet indicates that the process for the data is suspended, wherein at least one of the plurality of communication units comprises a first register that holds first identification information, sets identification information of a packet that holds data having been processed by a corresponding one of the two or more of processing units to the first identification information in a case of outputting the data having been processed by the corresponding one of the two or more of processing units, and transfers the packet at a predetermined transmission interval, the at least one of the plurality of communication units performing:

controlling a determination unit to determine whether or not identification information of the received packet matches the first identification information;

controlling a detection unit to detect whether or not the suspension information regarding the received packet indicates that the process for data held by the received packet is suspended; and controlling a control unit to extend the transmission interval in a case where it is determined by the determination unit that the identification information of the received packet matches the first identification information held in the at least one of the plurality of communication units and it is detected by the detection unit that the suspension information regarding the received packet indicates that the process for data held by the received packet is suspended, wherein in the controlling the control unit, in a case where it is determined that the identification information of a further received packet matches the first identification information held in the at least one of the plurality of communication units and it is detected that the suspension information regarding the further received packet indicates that the process for data held by the further received packet is suspended with a first predetermined period after the control unit extends the transmission interval, the control unit is further controlled to extend the transmission interval by a second predetermined period smaller than the first predetermined period.

8. A non-transitory computer-readable storage medium storing a computer program for, when executed by a computer comprised in at least one of a plurality of communication units comprised in an information processing apparatus, which comprises the plurality of communication units connected to a bus in a ring shape, wherein two or more of the plurality of the communication units are connected to a respective one of two or more of processing units, which executes a predetermined process, and the two or more of processing units execute respective processes in a predetermined order to execute a sequence of processes for input data, a packet is transferred by each of the plurality of the communication units over the bus in one direction of the ring shape, and the packet goes round the bus once by passing through each of the plurality of communication units once, wherein each of the plurality of communication units receives the packet from an upstream communication unit in the one direction of the plurality of communication units and transmits the packet to a downstream communication unit in the one direction of the plurality of communication units, wherein the packet can hold data to be processed, identification information, and suspension information indicating whether or not one of the two or more of processing units that is to execute a corresponding process out of the respective processes on the data has suspended the corresponding process, wherein each of the plurality of communication units connected to the respective one of the two or more of processing units obtains, based on the identification information of a received packet, data held by the received packet and passes the obtained data to the respective one of the two or more of processing units, while the each of the plurality of communication units sets, in a case where the respective one of the two or more of processing units cannot obtain data included in the received packet, the suspension information of the received packet to a state indicating that a process for the data is suspended, and transfers the packet including the data that cannot be obtained, wherein the each of the plurality of communication units transfers the received packet without processing the data included in the received packet, in a case where the suspension information of the received packet indicates that the process for the data is suspended, and wherein at least one of the plurality of communication units comprises a first register that holds first identification information, sets identification information of a packet that holds data having been processed by a corresponding one of the two or more of processing units to the first identification information in a case of outputting the data having been processed by the corresponding one of the two or more of processing units, and transfers the packet at a predetermined transmission interval, controlling the computer to:

determine whether or not identification information of the received packet matches the first identification information;

detect whether or not the suspension information regarding the received packet indicates that the process for data held by the received packet is suspended; and control to extend the transmission interval in a case where it is determined that the identification information of the received packet matches the first identification information held in the at least one of the plurality of communication units and it is detected that the suspension information regarding the received packet indicates that the process for data held by the received packet is suspended, wherein in a case where it is determined that the identification information of a further received packet matches the first identification information held in the at least one of the plurality of communication units and it is detected that the suspension information regarding the further received packet indicates that a process for data held by the further received packet is suspended with a first predetermined period after the transmission interval is extended, further control to extend the transmission interval by a second predetermined period smaller than the first predetermined period is executed.

9. An information processing apparatus, which comprises a plurality of communication units connected to a bus in a ring shape, wherein two or more of the plurality of the communication units is connected to a respective one of two or more of processing units, which executes a predetermined process, and the two or more of processing units execute respective processes in a predetermined order to execute a sequence of processes for input data, a packet is transferred by each of the plurality of the communication units over the bus in one direction of the ring shape, and the packet goes round the bus once by passing through each of the plurality of communication units once, wherein each of the plurality of communication units receives the packet from an upstream communication unit in the one direction of the plurality of communication units and transfers the packet to a downstream communication unit in the one direction of the plurality of communication units, wherein the packet can hold data to be processed, identification information, and suspension information, indicating whether or not one of the two or more of processing units that is to execute a corresponding process out of the respective process on the data has suspended the corresponding process, wherein at least one of the plurality of communication units, which is connected to a processing unit that executes the respective process of the sequence of processes, comprising:

a determination unit configured to determine whether or not a received packet is a packet holding data that has been processed by the corresponding processing unit;

a detection unit configured to detect whether or not a process that is to be executed on data held in the received packet is suspended; and a control unit configured to output data that has been processed by the corresponding processing unit at a transmission interval that is determined according to a number of packets, for each of which it is determined that data that has been processed by the corresponding processing unit is held and it is detected that the process that is to be executed is suspended, in a case where it is determined by the determination unit that the received packet holds data that has been processed by the corresponding processing unit and it is detected by the detection unit that the process that is to be executed on data held in the received packet is suspended, and to output data that has been processed by the corresponding processing unit at a predetermined minimum transmission interval, in a case where it is determined by the determination unit that the received packet holds data that has been processed by the corresponding processing unit and it is detected by the detection unit that the process that is to be executed on data held in the received packet is not suspended.

10. The apparatus according to claim 9, wherein the control unit sets a value of the transmission interval, wherein the value varies depending on frequency of packets, for each of which it is determined that data that has been processed by the corresponding processing unit is held and it is detected that a process that is to be executed is suspended.

11. The apparatus according to claim 9, wherein the control unit limits a value of the transmission interval so that the transmission interval is not more than a predetermined value.

12. An information processing apparatus including at least a first processing unit and a second processing unit comprising:
 a first communication unit configured to connect with a ring bus and set a flag of a received packet which has first data, wherein the flag indicates a process for the first data has been stalled, if the first processing unit connected with the first communication unit does not process data to be processed by the first processing unit wherein the first data is included in the received packet, and transmit the received packet to the ring bus, wherein the packet is transferred over the ring bus in one direction; and
 a second communication unit configured to connect with the ring bus and transmit data for the first processing unit, processed by a second processing unit connected with the second communication unit, to the ring bus,
 wherein the second communication unit pauses transfer of another piece of data for the first processing unit that has been processed by the second processing unit connected with the second communication unit for a period that corresponds to a number of packets, for each of which the second communication unit detects that the flag is set in a case where the second communication unit detects that the first communication unit outputs a packet, for which the flag is set, and
 wherein each of the first and second communication units transfers data at a predetermined minimum transmission interval, in a case where the flag of the received packet is not set.

13. A communication method in an information processing apparatus, which comprises a plurality of communication units connected to a bus in a ring shape, wherein two or more of the plurality of the communication units is connected to a respective one of two or more of processing units, which executes a predetermined process, and the two or more of processing units execute respective processes in a predetermined order to execute a sequence of processes for input data, a packet transferred by each of the plurality of the communication units over the bus in one direction of the ring shape, and the packet goes round the bus once by passing through each of the plurality of communication units once,
 wherein each of the plurality of communication units receives the packet from an upstream communication unit in the one direction of the plurality of communication units and transfers the packet to a downstream communication unit in the one direction of the plurality of communication units,
 wherein the packet can hold data to be processed, identification information indicating whether or not one of the two or more of processing units that is to execute a corresponding process out of the respective processes on the data has suspended the corresponding process, and
 wherein at least one of the plurality of communication units, which is connected to a processing unit that executes the respective process of the sequence of processes, performing the steps of:
 controlling a determination unit to determine whether or not a received packet is a packet holding data that has been processed by a corresponding processing unit;
 controlling a detection unit to detect whether or not a process that is to be executed on data held in the received packet is suspended; and
 controlling a control unit to output data that has been processed by the corresponding processing unit at a transmission interval that is determined according to a number of packets, for each of which it is determined that data that has been processed by the corresponding processing unit is held and it is detected that the process that is to be executed is suspended, in a case where it is determined by the determination unit that the received packet holds data that has been processed by the corresponding processing unit and it is detected by the detection unit that the process that is to be executed on data held in the received packet is suspended, and to output data that has been processed by the corresponding processing unit at a predetermined minimum transmission interval, in a case where it is determined by the determination unit that the received packet holds data that has been processed by the corresponding processing unit and it is detected by the detection unit that the process that is to be executed on data held in the received packet is not suspended.

14. A communication method in an information processing apparatus including at least a first processing unit and a second processing unit comprising:
 controlling a first communication unit to connect with a ring bus and set a flag of a received packet which has first data, wherein the flag indicates a process for the first data has been stalled, if the first processing unit connected with the first communication unit does not process first data to be processed by the first processing unit wherein the first data is included the received packet, and transmit the received packet to the ring bus, wherein the packet is transferred over the ring bus in one direction; and
 controlling a second communication unit to connect with the ring bus and transmit data for the first processing unit, processed by a second processing unit connected with the second communication unit, to the ring bus,
 wherein the second communication unit is controlled to pause transfer of another piece of data for the first processing unit that has been processed by the second processing unit connected with the second communication unit in a period that corresponds to a number of packets, for each of which the second communication unit detects that the flag is set in a case where the second communication unit detects that the first communication unit outputs a packet, for which the flag is set, and wherein each of the first and second communication units is controlled to transfer data at a predetermined minimum transmission interval, in a case where the flag of the received packet is not set.

15. An information processing apparatus, which comprises a plurality of communication units connected to a bus in a ring shape, wherein two or more of the plurality of the communication units is connected to a respective one of two or more of processing units, which executes a predetermined process, and the two or more of processing units execute respective processes in a predetermined order to execute a sequence of processes for input data, a packet is transferred by each of the plurality of the communication units over the bus in one direction of the ring shape, and the packet goes round the bus once by passing through each of the plurality of communication units once, wherein each of the plurality of communication units receives the packet from an upstream communication unit in the one direction of the plurality of communication unit and transfers the packet to a downstream communication unit in the one direction of the plurality of communication units, wherein the packet can hold data to be processed, identification information, and suspension information indicating whether or not one of the two or more of processing units that is to execute a corresponding process out of the respective processes on the data has suspended the corresponding process, and wherein at least one of the plurality of communication units, which is connected to a processing unit that executes the respective process of the sequence of processes, comprising:

a determination unit configured to determine whether or not the received packet holds data, which is to be processed by another processing unit that executes a more downstream process than a corresponding processing unit of the at least one of the plurality of communication units in the sequence of processes;

a detection unit configured to detect whether or not a process that is to be executed on data held in the received packet is suspended; and a control unit configured to output data that has been processed by the corresponding processing unit at a transmission interval that is determined according to a number of packets, for each of which it is determined that data that has been processed by the corresponding processing unit is held and it is detected that the process that is to be executed is suspended by another processing unit, in a case where it is determined by the determination unit that the received packet holds data, which is to be processed by the other processing unit that executes a more downstream process than the corresponding processing unit in the sequence of processes and it is detected by the detection unit that the more downstream process that is to be executed on the data held in the received packet is suspended, wherein the each of the plurality of communication units transfers data at a predetermined minimum transmission interval, in a case where the suspension information of the received packet indicates that the process for the data is not suspended.

16. A communication method in an information processing apparatus, which comprises a plurality of communication units connected to a bus in a ring shape, wherein two or more of the plurality of the communication units is connected to a respective one of two or more of processing units, which executes a predetermined process, and the two or more of processing units execute respective processes in a predetermined order to execute a sequence of processes for input data, a packet is transferred by each of the plurality of the communication units over the bus in one direction of the ring shape, and the packet goes round the bus once by passing through each of the plurality of communication units once, wherein each of the plurality of communication units receives the packet from an upstream communication unit in the one direction of the plurality of communication units and transfers the packet to a downstream communication unit in the one direction of the plurality of communication units, wherein the packet can hold data to be processed, identification information, and suspension information indicating whether or not one of the two or more of processing units that is to execute a corresponding process out of the respective processes on the data has suspended the corresponding process, and wherein at least one of the plurality of communication units, which is connected to a processing unit that executes the respective process of the sequence of processes, performing the steps of:

controlling a determination unit to determine whether or not the received packet holds data, which is to be processed by another processing unit that executes a more downstream process than a corresponding processing unit of the at least one of the plurality of communication units in the sequence of processes;

controlling a detection unit to detect whether or not a process that is to be executed on data held in the received packet is suspended; and controlling a control unit to output data that has been processed by the corresponding processing unit at a transmission interval that is determined according to a number of packets, for each of which it is determined that data that has been processed by the corresponding processing unit is held and it is detected that the process that is to be executed is suspended by the other processing unit, in a case where it is determined by the determination unit that the received packet holds data, which is to be processed by the other processing unit that executes a more downstream process than the corresponding processing unit in the sequence of processes and it is detected by the detection unit that the process that is to be executed on the data held in the received packet is suspended, wherein the each of the plurality of communication units is controlled to transfer data at a predetermined minimum transmission interval, in a case where the suspension information of the received packet indicates that the process for the data is not suspended.

* * * * *